United States Patent
Rosewarne et al.

(10) Patent No.: US 7,415,204 B1
(45) Date of Patent: Aug. 19, 2008

(54) PHOTO BOOTH AND METHOD FOR PERSONALIZED PHOTO BOOKS AND THE LIKE

(75) Inventors: Fenton Rosewarne, Carlsbad, CA (US); James A. Schuyler, San Francisco, CA (US); Paul Fullwood, Bakersfield, CA (US)

(73) Assignee: Digital Imagination, Inc., Glendale, CA (US)

( * ) Notice: Subject to any disclaimer, the term of this patent is extended or adjusted under 35 U.S.C. 154(b) by 681 days.

(21) Appl. No.: 11/001,733

(22) Filed: Dec. 1, 2004

Related U.S. Application Data

(63) Continuation-in-part of application No. 10/846,987, filed on May 13, 2004.

(60) Provisional application No. 60/471,241, filed on May 15, 2003.

(51) Int. Cl.
G03B 15/00 (2006.01)
G03B 29/00 (2006.01)
G09G 5/00 (2006.01)
G06F 3/12 (2006.01)

(52) U.S. Cl. .................. 396/310; 396/429; 345/634; 358/1.15

(58) Field of Classification Search .......... 396/1–4, 396/310, 311, 428, 429; 348/231.99, 231.2, 348/231.3, 231.6, 207.1, 207.2; 345/634, 345/636
See application file for complete search history.

(56) References Cited

U.S. PATENT DOCUMENTS

| 3,892,427 | A | | 7/1975 | Kraynak | 281/15.1 |
| 3,982,744 | A | | 9/1976 | Kraynak | 270/12 |
| 4,616,327 | A | | 10/1986 | Rosewarne et al. | 345/636 |
| 5,687,306 | A | * | 11/1997 | Blank | 345/634 |
| 5,729,674 | A | | 3/1998 | Rosewarne et al. | 345/634 |
| 2002/0152001 | A1 | * | 10/2002 | Knipp et al. | 700/100 |

* cited by examiner

*Primary Examiner*—W. B. Perkey
*Assistant Examiner*—Rishi Suthar
(74) *Attorney, Agent, or Firm*—Wagner, Anderson & Bright, LLP

(57) ABSTRACT

A photo subject station used to capture information regarding a subject suitable for integration into a personalized, printed product and method of using same with children so that a personal identification of a child need not be saved to deliver a customized product to the child when the child takes part of a session, for example, at a school. The station uses a stool, a color background device, preferably two digital cameras and lights located at fixed positions in the station and a computer. The computer creates and stores a subject file for each subject that contains photographs of the subject (e.g., three frontal and three profile photographs with three different facial expressions, plus a rear photograph), an image data file associated with the photographs (which contains x-y coordinates used for scaling the photographs), a data file containing an identification related to the subject and a bit map skin file (derived from one of the photographs for use in fixing personalized skin color). The method uses a coordinator whose identity is used for shipping personalized products and assisting in a session.

9 Claims, 23 Drawing Sheets

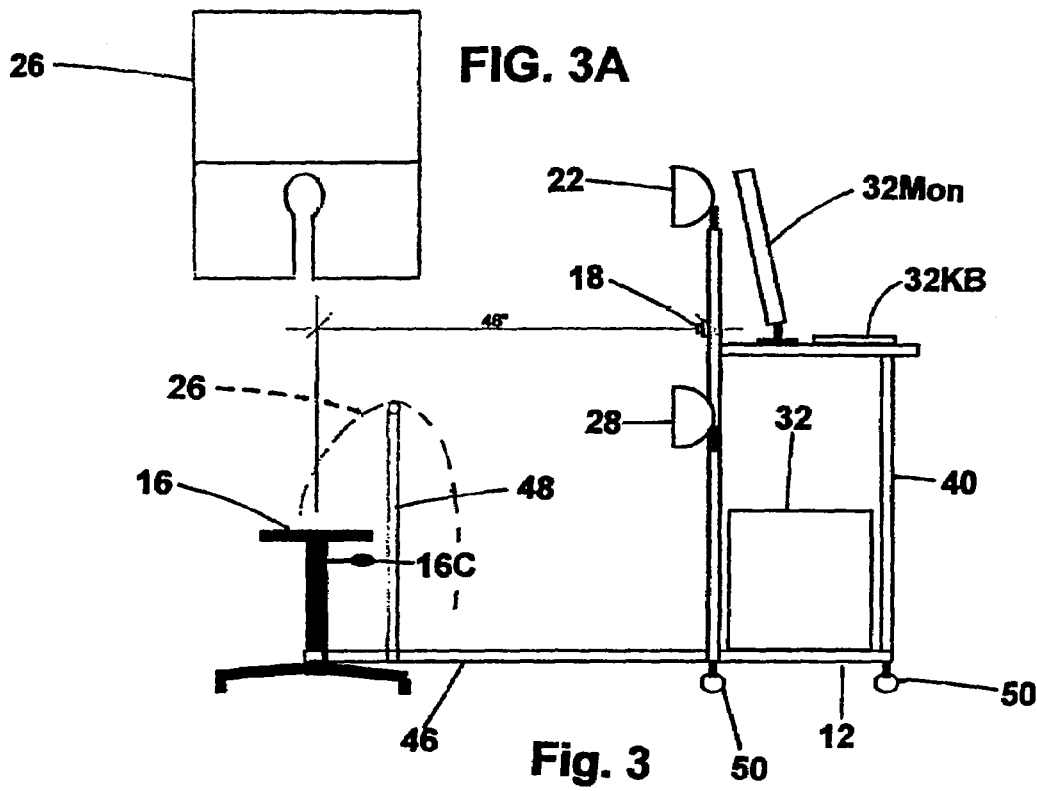
FIG. 3A
Fig. 3
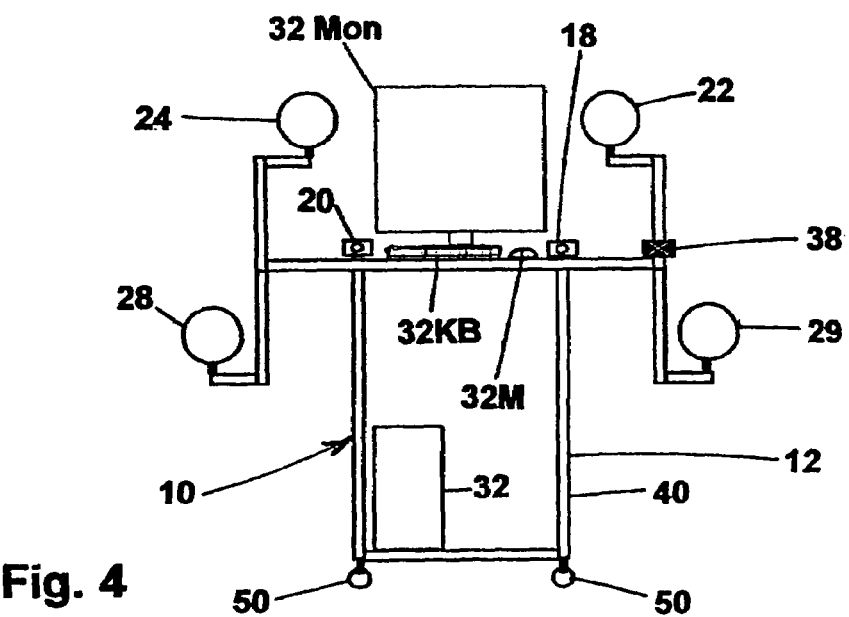
Fig. 4

PHOTO BOOTH AND METHOD FOR PERSONALIZED PHOTO BOOKS AND THE LIKE

CROSS REFERENCE TO RELATED APPLICATIONS

This application is a continuation-in-part application of U.S. Ser. No. 10/846,987, filed May 13, 2004, which claims benefit of U.S. Provisional Patent Application Ser. No. 60/471,241, filed May 15, 2003, the disclosures of which are specifically incorporated herein by reference.

BACKGROUND OF THE INVENTION

In the development of the first computer-controlled system for producing personalized graphics and text products, which is the subject of U.S. Pat. No. 4,616,327, issued Oct. 7, 1986, we recognized the application of such a system to the production of personalized books, particularly for children was a desirable application. The original use of the invention was in the production of posters and other personalized novelty or occasional materials.

In the exploration of book applications, it became immediately apparent that the personalized book affords an opportunity to refine the basic principles disclosed in the aforementioned patent of one of the co-inventors of this application and provide personalized, meaningful texts with graphics rising to the level of complementary caricatures of the person represented. This led to the specification of systems that could mass-produce books and uniquely check the sequence and completion of page sets, as described in U.S. Pat. No. 5,729,674.

The systems and methods of U.S. Pat. Nos. 4,616,327 and 5,729,674 both utilize a standardized pre-printed background containing background graphics and text with openings in both the text and background for the insertion of personalized images and names or other terms. A plurality of graphical segments, such as nose profiles, are stored in a digital computer, as are other details, such as sports equipment representations, glasses, and the like. A data input device, such as a card reader, is adapted to read personalized data, such as sex, age group, hair style and length, glasses or no glasses, and favorite sport or hobby.

The computer receives the personalized data and uses it to select graphical and text files, which are output to a plotter or other representation-producing device. The plotter or other device produces line sketches at the appropriate portion of the background consistent with the personalized data. Personalized text augments the pre-printed text at the proper location.

The above-described invention, when applied to books, adds much more personalization than heretofore possible. As noted in the background section of U.S. Pat. No. 4,616,327, prior to that invention, personalization of books, particularly for children, has been limited to personalized text, as in U.S. Pat. Nos. 3,982,744 and 3,892,427. The system and methods of U.S. Pat. No. 5,729,674 describes how we incorporate such a system into one which prints large quantities of personalized books using such a method.

The co-pending Non-Provisional patent application Ser. No. 10/846,987 filed May 13, 2004 shows a further improvement in which further refinement is not only in personalized images but also in the production and fulfillment steps of the process.

BRIEF DESCRIPTION OF THE INVENTION

Faced with the prior art and the desire to make personalized books and products using actual photographs of the subject, such as a child, we envisioned that these needs could all be filled if:

1) Actual photos of the child's face and head can be taken with a variety of facial expressions and head positions against single color backgrounds and utilizing a similarly colored cloth drape over the individual's neck and clothing.
2) Data regarding the child is collected, such as age, sex, addresses, hobbies, and the like.
3) The photos are standardized and otherwise manipulated to convert them to artistic renderings consistent with the standard background graphics of the book illustrations while retaining distinctive characteristics of the subject.
4) The converted photos are selected in expression, view, and size to be integrated into the background graphics.
5) The text, standard graphics, and these newly produced artistic renderings of the subject and personalized text are introduced into a print memory.
6) The personalized artistic renderings and text are combined with stored standard background graphics and text, and are together printed to form pages of a personalized book or product. Sheets are cut, collated and bound, and the composite book or product is provided to a fulfillment subsystem and delivered to the customer. These last steps are accomplished employing the inventions of our copending patent application referenced above and co-applicant's U.S. Pat. No. 5,729,647.

Each finished personalized book appears as a custom, professionally printed, high-quality publication, with all personalized art and text fully integrated into the story material. The text of the book, story or product is also personalized to include names and phrases corresponding to the personalized data from the data/order entry subsystem.

We are able to personalize the story with not only specific details supplied by the customer, but also by the use of a variety of typefaces and graphics suggested by the story line, including appropriate facial expressions derived from actual photographs of the subject child and various angles of the child inserted appropriately into the story or product. The customer will find no difference in quality between the standard background graphics and text, and the personalized images and text portions of the printed material.

Prior personalized printing systems have not had the ability to print all of the elements of a story in one pass through the press, and consequently, the added personalized material was easily detected. Also, prior personalized books and products, at best, included caricatures of the subject or an actual photograph that did not blend in with the standard graphics. This invention, for the first time, utilizes an actual photograph of the subject and converts the photograph to an artistic rendering consistent with the background graphics so the subject actually appears in semi-animated form in the book or product, yet the subject is easily recognizable.

The most significant innovation is the fact that an actual image of the customer converted to an artistic rendering will appear in the book or product, rather than the generic, unidentifiable characterization heretofore considered state of the art for personalized books, or the use of an actual photograph of the subject that does not blend in with the background graphic material. Furthermore, the customer will not appear as a static onlooker, but as an active participant in the story through inserting and layering the converted art into the standard background graphics and through the liberal use of a variety of postures and expressions. Also, this system allows for a single first edition personalized book to be printed, which has never been done before.

GENERAL SUMMARY OF THE INVENTION

The present invention is generally directed to a photo subject station used to capture information regarding a subject suitable for integration into a personalized, printed product. The station is movable, and contains a stool or another means for positioning a subject with the subject's head at a preselected picture location, a color background device (photographic blue or green screen) for surrounding the subject with a single color (e.g., a green background screen, a green foreground screen, such as a smock, and a green neck wrap) when the subject is at the preselected picture location, one, or preferably two cameras (preferably digital), located at preselected locations from the preselected picture location that are illuminated by one or more lighting devices at preselected lighting locations, and a computer. The computer creates and stores a subject file for each subject that contains photographs of the subject, an image data file associated with the photographs, a data file containing an identification related to the subject and a bit map skin file.

In a first, separate group of aspects of the present invention, the bit map skin file contains a color file derived from a photograph of the subject while the subject file contains a first set of photographs with two or more facial expressions taken at a frontal angle and a second set of photographs with two or more facial expressions taken at a profile angle. The two sets of photographs, which may be three in number and each taken by a different camera simultaneously, can have three different facial expressions, such as a normal facial expression, a surprise facial expression and a smiling facial expression. The image data file contains an x-y coordinate entry for each photograph for use in scaling the photographs to a standard size; for frontal pictures, the x-y coordinate entry is a top of head marker and a chin marker, while a back of neck marker is added for profile pictures. The subject file can also contain a rear angle picture, in which case the image data file would contain a top of head and chin marker for the picture.

In a second, separate group of aspects of the present invention, the photo subject station is used to create a session file containing a subject file for each child whose photograph and data is captured during a session. Before the session is begun, arrangements are made to have multiple children at a preselected location (e.g., a school, which may be multiple locations) on a preselected date (which may cover more than one day) with a preselected party in charge of organization (which may be an organization or multiple persons). The photo subject station is set up for the session and then used to create the session file that is transferred to a back end operation where it is used to print a personalized product (such as a promotional brochure) for each child who took part in the session. Once all of the personalized products have been printed, they are shipped to the preselected party in charge of organization who then distributes them to the individual children; the party in charge of organization can also collect orders for personalized products and distribute such ordered products once they have been produced and shipped to that party. The subject file for each child does not need to contain a personal identification of the subject child.

Accordingly, it is a primary object of the present invention to provide a photo subject station that can be used for capturing information regarding subjects suitable for integration into personalized printed products, and a better method for using such a station with children.

These and further objects and advantages of the present invention will be readily apparent to those skilled in the art based upon the detailed description that follows.

BRIEF DESCRIPTION OF THE DRAWINGS

This invention may be more clearly understood with the following detailed description and by reference to the drawings in which:

FIG. 3 is a side elevational view of an operator's work station and subject stool and front green screen assembly of FIG. 2;

FIG. 3a is a plan view of the subject drape of FIG. 3;

FIG. 4 is a front elevational view of the camera/lighting setup and operator's work station for the photo booth of FIG. 2;

BRIEF DESCRIPTION OF THE OVERALL SYSTEM EMPLOYING THIS INVENTION

Figure 1:
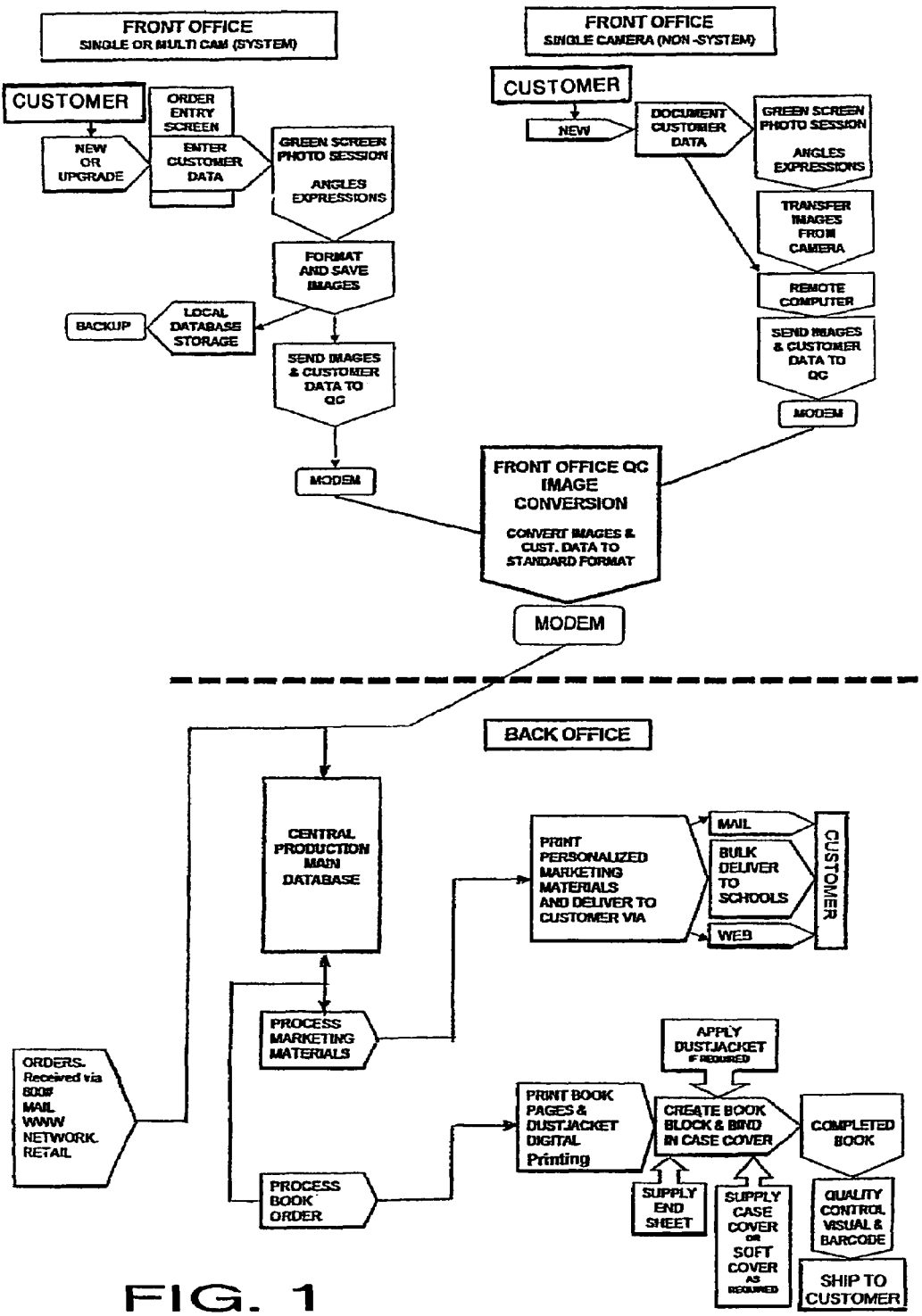
FIG. 1 is a flow diagram of a preferred embodiment of the entire system, including "Front Office" and "Back Office" operations.

This invention is part of an overall system for creating personalized books, and products, such as children's books. The overall system can be broken down into two parts, the "Front Office" and "Back Office". The invention described herein constitutes the "Front Office" or "retail installation" part of the overall invention and certain overall system concepts.

In the "Front Office", photos of the subject are obtained, whether obtained using the preferred specialized photo system booth using one or more cameras, from a traditional photography studio using one or more cameras, from a single digital or film camera, or from electronically mailed or scanned photographs. Data regarding the customer is also collected. The photos are standardized and converted to art, either at the photo studio or in the back office, then inserted into the book or product background along with customized text. Once this is completed, the personalized book or product is transmitted to the "Back Office" for remaining functions not performed at the Front Office to be performed such as order processing, printing, binding, quality control and order fulfillment.

The preferred "Front Office" system includes a specialized photo station. The photo station uses one to three cameras, digital or film, multiple lighting, a subject stool, solid color background screen, such as green or blue screen, subject smock of the same color as the background, and computer system for producing and converting desired photos of the subject to artistic renderings to be inserted as personalized art into the book or product. One or more cameras and lighting can be set or pre-positioned for the required views and facial expressions of the subject.

The computer system controls the cameras and lighting, and provides an operator with screen displays and data entry options, camera operation, photo selection options, and photo to artistic rendering conversion, all occurring during a single photo session.

In other versions of the system, the photo station with lighting, subject stool, and green screen assembly can be used with a single camera, digital or film, or alternatively, a single color background, such as found in existing photography studios, can be used with subject stool and a single camera, digital or film. In the simplest system, customers can take photographs of the subject, digital or film, and forward the photographs to the "Back Office" via the Internet or even mail.

The "Front Office" provides the input to a printing system termed the "Back Office", which cooperates with a fulfillment subsystem as described in co-pending Non-Provisional patent application Ser. No. 10/846,987 filed May 13, 2004. Both the "Front Office" and "Back Office" systems may be combined in a retail operation, and the "Back Office", including or excluding fulfillment system, may be miles or continents away with a communication link. Online Internet operation of this system is also within the capability of this invention in accordance with the teaching in U.S. Pat. No. 5,829,674 or the above mentioned copending application.

DETAILED DESCRIPTION OF THE INVENTION

In contrast to prior systems for producing personalized books and other products, we have determined that it is possible to make personalized books and other products using actual photographs of the subject that are converted to art, inserting the converted photographs, and personalized text into the book or other product so that the art and text is layered and blended in with the background graphics and text, then print a single copy of the book or product and deliver it to the customer. The personalized image, in deed, represents the subject but blends in like all other illustrations in the book in colors, tone and other characteristics.

This is accomplished through the overall system, including both "Front Office" and "Back Office", as illustrated in FIG. 1.

A description of the overall system for production of personalized books or other documents with realistic graphically integrated illustrations is considered to be important in order to assist the reader of the invention to understand the system.

FIG. 1 shows in the top half the two forms of front office, namely, a single or multi-camera system and a single camera front office without a full business setup. In FIG. 1, the front offices are separated from the back-office operations by a dashed line.

The upper left-hand front office shows that a customer may be either new or a repeater upgrade customer. Customer data is collected, such as a name and address of the person ordering the book or document, and the name and other information of the subject. The data of the subject is necessary for integration into the personalized book or document. All data is entered into an order entry screen on the computer, which is also used to conduct the photo session. The photo session uses a green screen background in which typically three different angles of the subject are taken and three or four different facial expressions related to the book or document selected.

In any event, the various expressions, which can include smiling, alarm, talking, and at rest, can usually serve for any of the number of books or documents. The images are formatted and saved locally in the backup storage device and are sent to quality control usually by modem.

In the case of the single camera, customer data is sent directly to a remote computer, the photo session conducted, and the images are transferred from the camera to the remote computer. Both images and customer data are transferred by modem to the front office where the images are converted so they conform to the illustration format and coloring in the book or document such that the images of the subject match the background of each illustration where they are present. In either case of front office, single camera or multi camera, the information is transferred by modem to the back-office at the bottom half of FIG. 1. The data is entered into the central production main database from which that information can go into two branches, namely, the book order or the marketing materials process.

In the book order process, the printing system prints the book pages and cover and/or dust jacket. An end sheet and case cover or soft cover is provided and the book is bound to create a completed book. The book is processed through quality control and the bar code is verified. Once correct, the book is delivered to the customer or intended recipient.

The second route from the central production main database is to the marketing materials process where personalized marketing materials are created and sent to the customer, whether via mail or by the Web, or by some other means such as a centralized distribution. This affords the opportunity for the customer to see the personalized materials and facilitates ordering subsequent books or documents.

The back-office also provides input to the central production main database orders received by other routes, such as 800-number, mail, Internet, or retail.

FIG. 1 is a flow chart showing the complete process from beginning to end, including the "Front Office" and "Back Office", which is described in detail in the co-pending Non-Provisional patent application Ser. No. 10/846,987 filed May 13, 2004, for applicants. In FIG. 1, the "Front Office" portion can be accomplished via two separate systems, including a single or multiple cameras connected to the specialized system, or single camera not connected to the specialized system.

The single or multiple camera method connected to the system involves collecting data and taking pictures with one or more camera connected to a preferably local computer. In this process, one or more cameras are connected to the computer and a green screen photo session occurs with multiple, e.g., three angles and, for example, four expressions of the subject are taken. The customer data and photographs are then formatted and saved, then the images and data are sent to the back office via a modem for conversion.

In the single camera system, photographs are taken of the subject, including multiple angles and expressions. Any photographer or individual can take the photographs. The images are transferred from the camera to a remote computer by any number of methods, such as over the Internet, direct link up of the camera to the computer, scanning or transfer via camera data storage chip.

Figure 2:
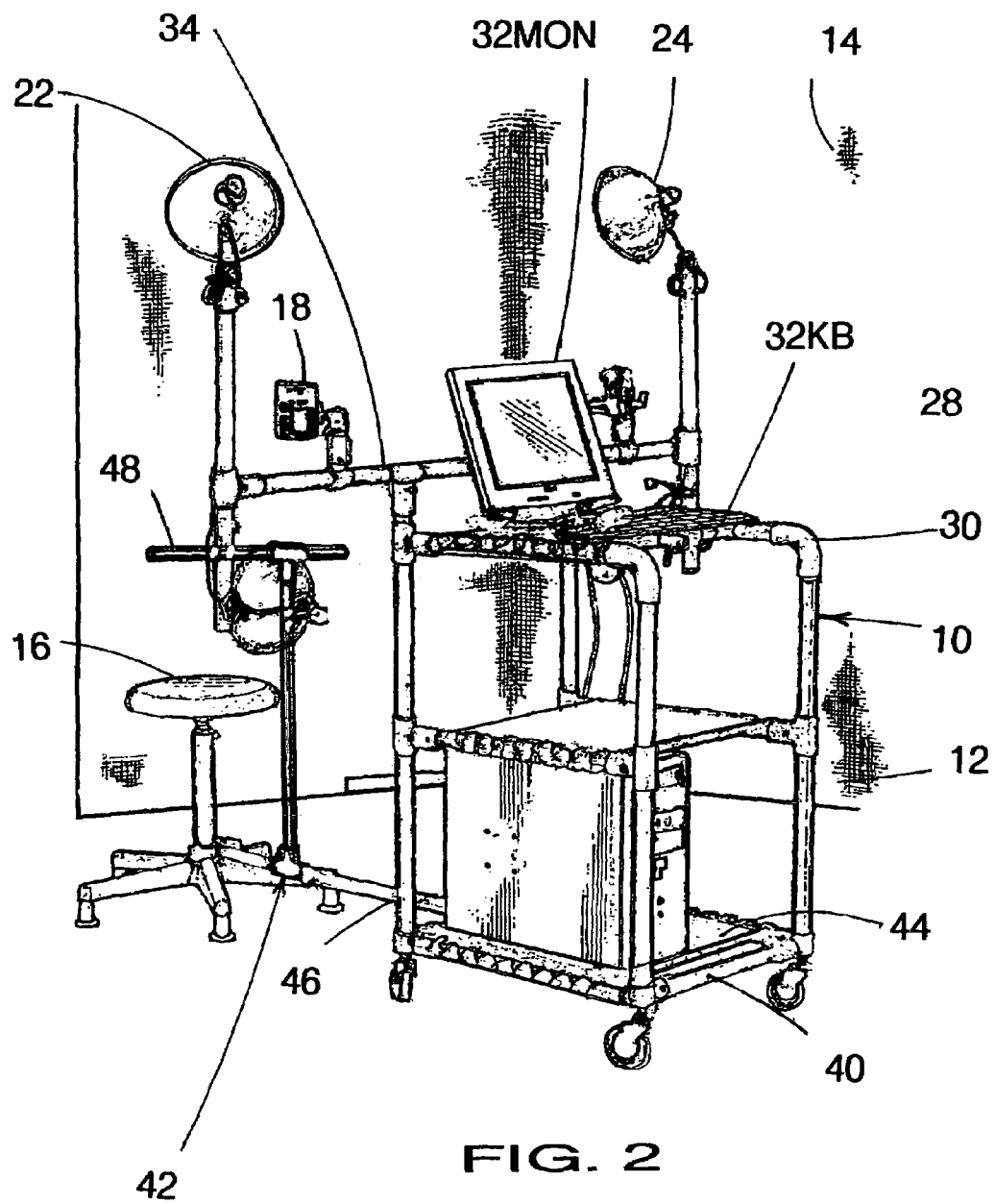
FIG. 2 is a perspective view of a preferred form of photo station.
Figure 7:
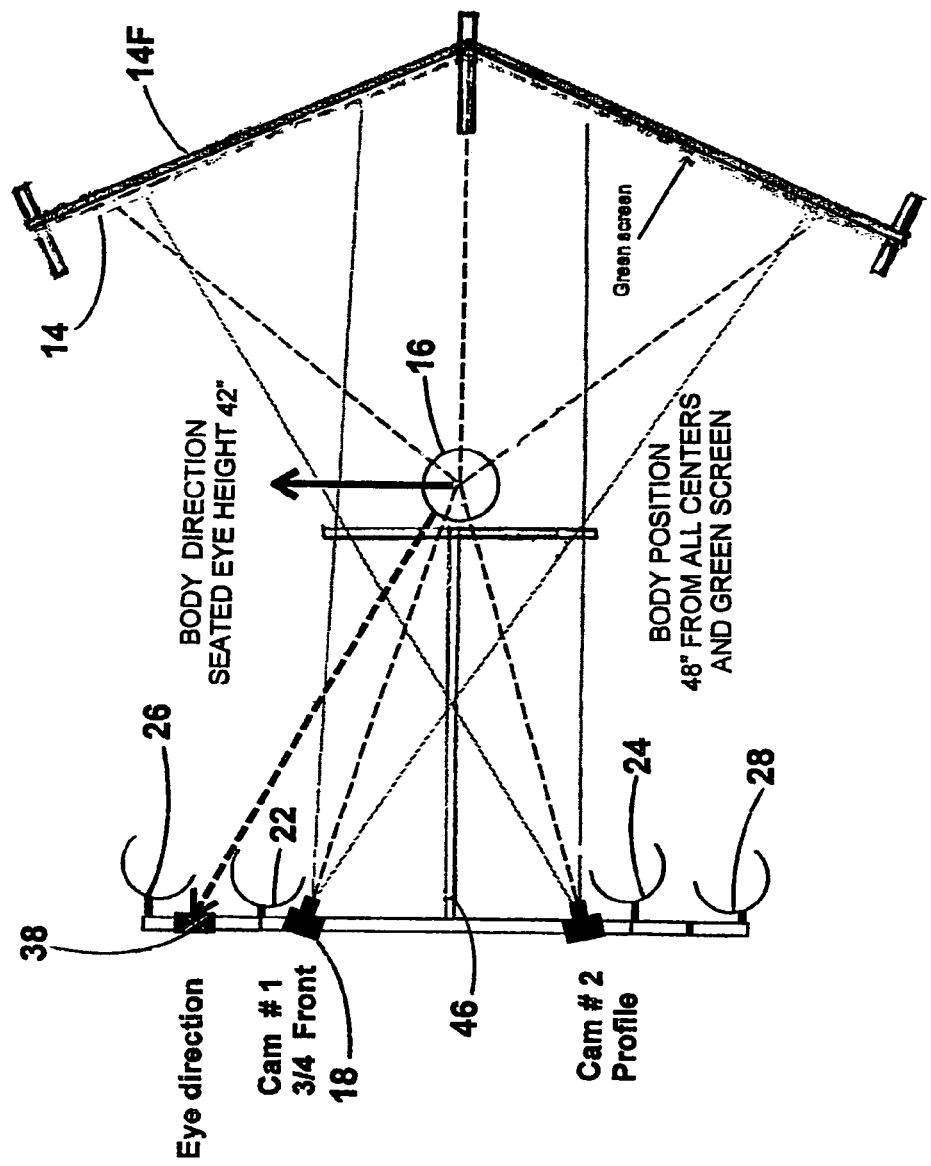
FIG. 7 is a top plan view of the camera/lighting setup, green screen assembly and subject stool showing the desired body position and camera orientations of FIG. 2.

In an especially preferred system, as illustrated in FIG. 2, comprising an improved photo station with a local computer, generally designated 10, is utilized, as shown in FIGS. 2 and 3. The computer can be a laptop or desktop computer, or any other device that has computational power and memory, especially given changes in today's electronics, and could even be a single microprocessor. The photo station 10 includes a solid colored background 14, a photo subject stool 16, a pair of similar fixed focus digital cameras 18 and 20, along with associated lights 22 and 24. The cameras 18 and 20 and lights 22 and 24 are either mounted on the operator's work station or located at precise positions in relation to the subject as best illustrated in FIG. 7. Cameras 18 and 20 are precisely aligned at preselected locations to consistently produce photographs of the subject at different facial angles required for later insertion in a graphically personalized book or other document. Cameras 18 and 20 are capable of feeding slow, frame-rate video and high resolution still images to the host computer 32 (laptop or desktop). The operator's station is generally designated 12 and includes a top platform 30 supporting a laptop or a keyboard for the desktop computer system 32, which includes associated monitor 32 MON, keyboard 32 KB and a pointing device such as a mouse (not shown). Computer system 32 may be replaced with a laptop computer, which provides the keyboard, pointing device, storage, display and photo editing, and conversion of artwork.

The computer 32 is shown on the bottom rack 44 of the computer cart 40. The cart 40 is preferably outfitted with wheels for movement of the entire assembly 10, including the subject stool 16 which is secured to the cart 40 by an arm 46 which fixes the position of the subject at a fixed position, e.g., 42", from cameras 18 and 20. Attached to arm 46 and located directly in front of the subject is drape support 48, which holds the drape or front screen 26, which is worn by the subject. The drape or front screen 26 is of the same color as the background 14. A simple smock may substitute for the drape 26 provided it presents a generally shadow-free appearance. The single colored background 14, e.g., matte green or blue finish, and subject drape shown in FIGS. 3 and 3a are used to facilitate the removal of the background from the images, although an additional neck wrap (not shown) may also be used.

FIG. 3 is a side elevational view of the operator's station 12 of the preferred photo station of FIG. 2. Operator's station 12 includes computer 32, monitor 32 MON, and keyboard 32 KB on computer cart 40. FIG. 3 only shows one mounted camera 18, although two or more cameras can be mounted on cart 40. FIG. 3 also shows mounted light 22 and optional additional fill lighting 28. Computer cart 40 is connected to the photo subject stool 16 via arm 46 in order to position the subject at the correct distance from camera 18 and light 22 (alternatively, light 22 can be placed in a shadow box). The height of stool 16 can be adjusted up or down via subject stool control knob 16C. Drape support 48, and a simple horizontal bar, is positioned in front of and, a short distance from, subject stool 16 in order to hold subject drape 26 (shown in dashed lines).

The subject drape 26 is held in place by drape support 48, with the front panel falling in front of the subject and subject stool 16, and the rear panel with cut out to fit over subject's head and shoulders, and hangs over the subject's back. Subject drape 26 is the same color as the background 14 shown in FIG. 2 and conceals the subject's clothing. The shape of drape 26 is illustrated in dashed lines in FIG. 3a.

FIG. 4 is an elevational view of operator's station 12 of FIG. 2 without arm 46, subject stool 16, or drape support 48. FIG. 4 is the view seen by the subject while seated in subject stool 16. FIG. 4 also shows mounted cameras 18 and 20, the rear side of monitor 32 MON, keyboard 32 KB, computer 32, and wheels 50 making computer cart 40 movable. FIG. 4 shows four lights 22, 24, 28, and 29 and target 38. We have found that as few as two or three halogen lights with appropriate defusers can provide the required quality lighting.

Referring again to FIG. 2 in combination with FIGS. 2 and 3, the subject, usually a child, is seated at a specified distance in front of computer cart 40. In this manner the subject is correctly positioned for all of the session photographs. Also included in operator's station 12 is a target 38, which the subject is instructed to look at. Target 38 can be a marker, light, mirror, or video screen, for example, positioned to be viewed by the subject for instructions or as a point of the subject's focus during the photographing process. As the child looks at target 38, camera 18 takes a ¾ front view photograph of the subject, while camera 20, simultaneously or sequentially, takes a profile view of the subject. During the photographing process, the subject is asked to make various facial expressions, such as a normal relaxed expression, smiling, showing alarm, and talking.

Figure 6:
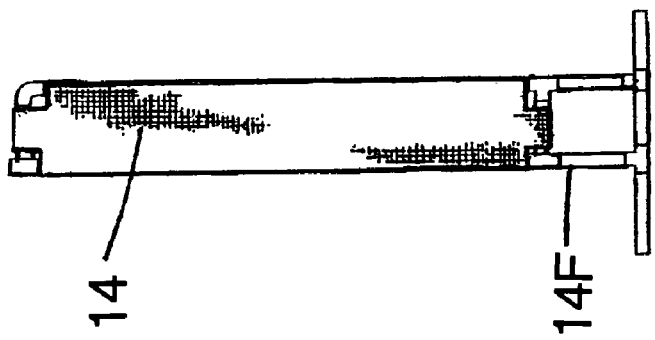
FIG. 6 is a side elevational view of the back green screen assembly of FIG. 2.
Figure 5:
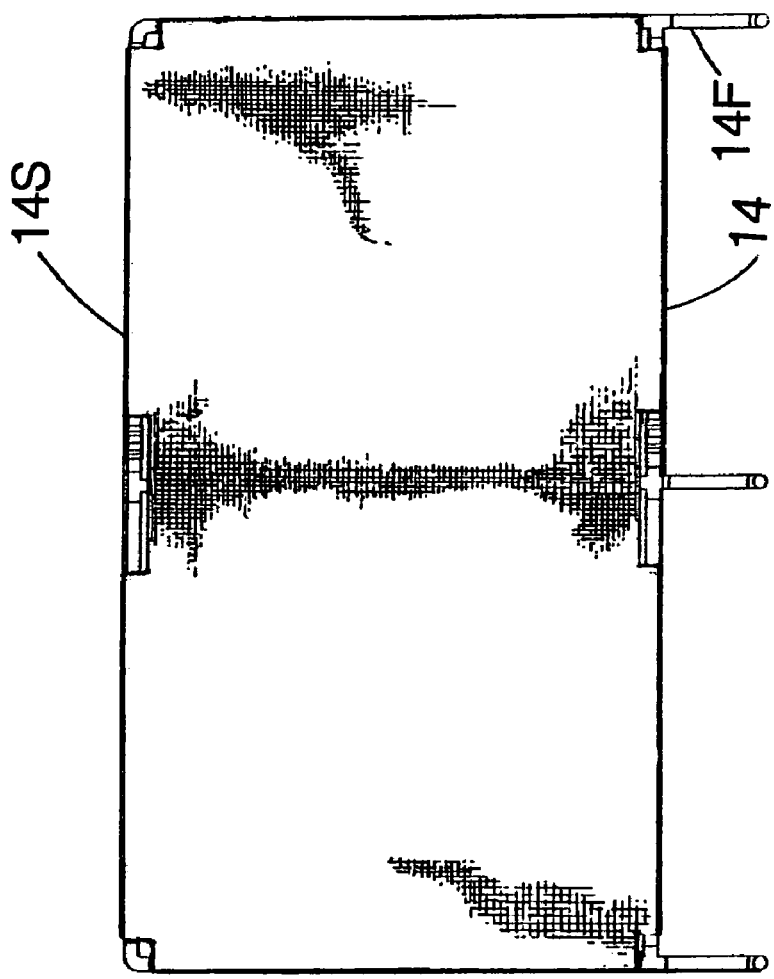
FIG. 5 is a front elevational view of the back green screen assembly of FIG. 2.

Now referring to FIGS. 5 and 6, they show front and side elevational views, respectively, of the preferred background, generally referred to as 14, including framework 14F, which is foldable and carries on its front a single color screen 14S, such as a green or blue screen that constitutes a background. As described above, the child is draped in a single color drape or smock and optional collar matching the color of background 14. Although it is possible using software to remove background from the photographic image of the child's head without utilizing a single color background and smock and collar, the process is greatly simplified and much quicker if the preferred method using background 14 and matching smock and collar is followed.

The preferred positioning of the subject in relation to the cameras, lighting, target, and background is illustrated in FIG. 7. In FIG. 7, the child is seated on subject stool 16 facing forward along the direction indicated by the horizontal arrow extended from subject stool 16. Subject stool 16 is pre-positioned 48" from all cameras by arm 46. This body position ensures that the child is the correct distance from the cameras and lights. The child should also be seated at an eye height of 42" so the child's face is at the correct height for the framing window as shown to the operator on the computer's monitor 32 MON. While facing forward, the child is instructed to turn his head to the right and look at target 38. As the child looks at target 38, camera 18 takes ¾ front photographs of the child, while camera 20 simultaneously takes profile photographs of the child. Lights 22, 24, 28, and 29 are also pre-positioned in relation to the cameras and subject for proper illumination of the subject and background during the photographic session.

Figure 8:
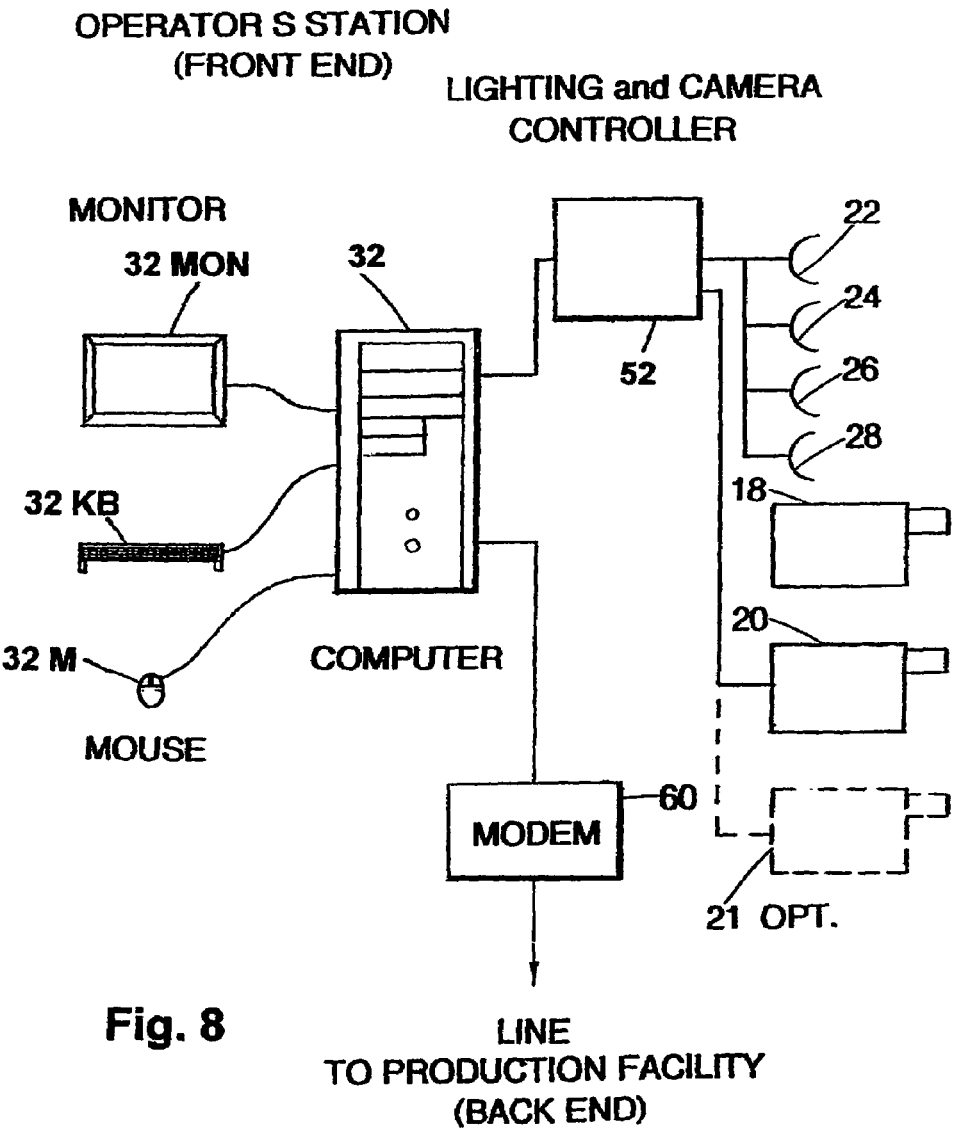
FIG. 8 is a block diagram showing the Operator's Station, including lights, cameras and computer of FIG. 2.

FIG. 8 is a block diagram showing that the lights and cameras of the operator's station are controlled by controller and computer, and the data collected is either processed locally or transmitted via modem to a production facility. Lighting and camera controller 52 (under the operator's control using the pointing device on computer 32 and following screen prompts) controls the sequencing of cameras 18, 20, and optional camera 21, in coordination with lights 22, 24, 28, and 29. The sequencing is arranged to ensure proper illumination of the subject, while photos are being taken by cameras 18, 20, and optionally, camera 21, during the photo sessions. The operator's station also includes computer monitor 32 MON, keyboard 32 KB and mouse 34M.

FIG. 8 also illustrates the operator's station, showing the control of the station and transmittal of data from the operator station to the production facility. The camera controller 52 can either be a separate controller or part of computer 32. Also connected to computer 32 is monitor 32 MON, keyboard 32 KB, and mouse 34M. Computer 32 is connected to modem 60

(which may actually be part of computer 32), which transfers data to the production facility, where the data is inserted in book templates, printed, bound, and shipped to customers.

Figure 9:
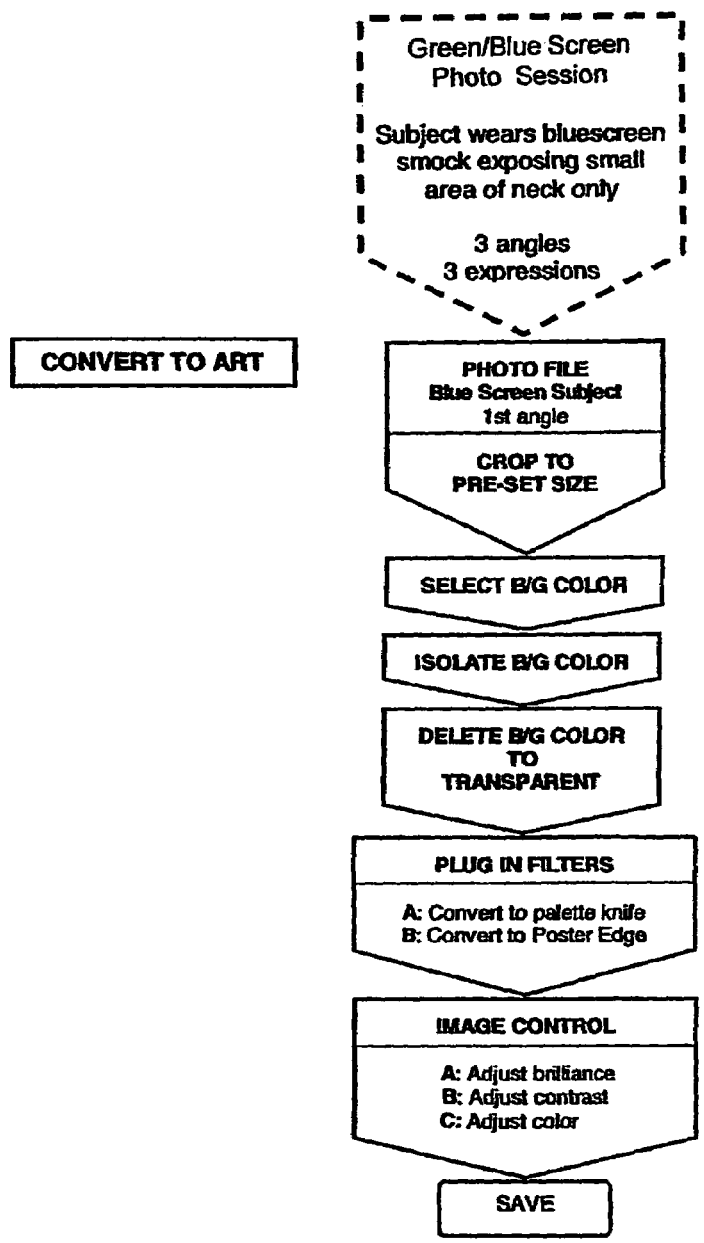
FIG. 9 is a flow diagram of the process for converting photographs to saved images.
Figure 10:
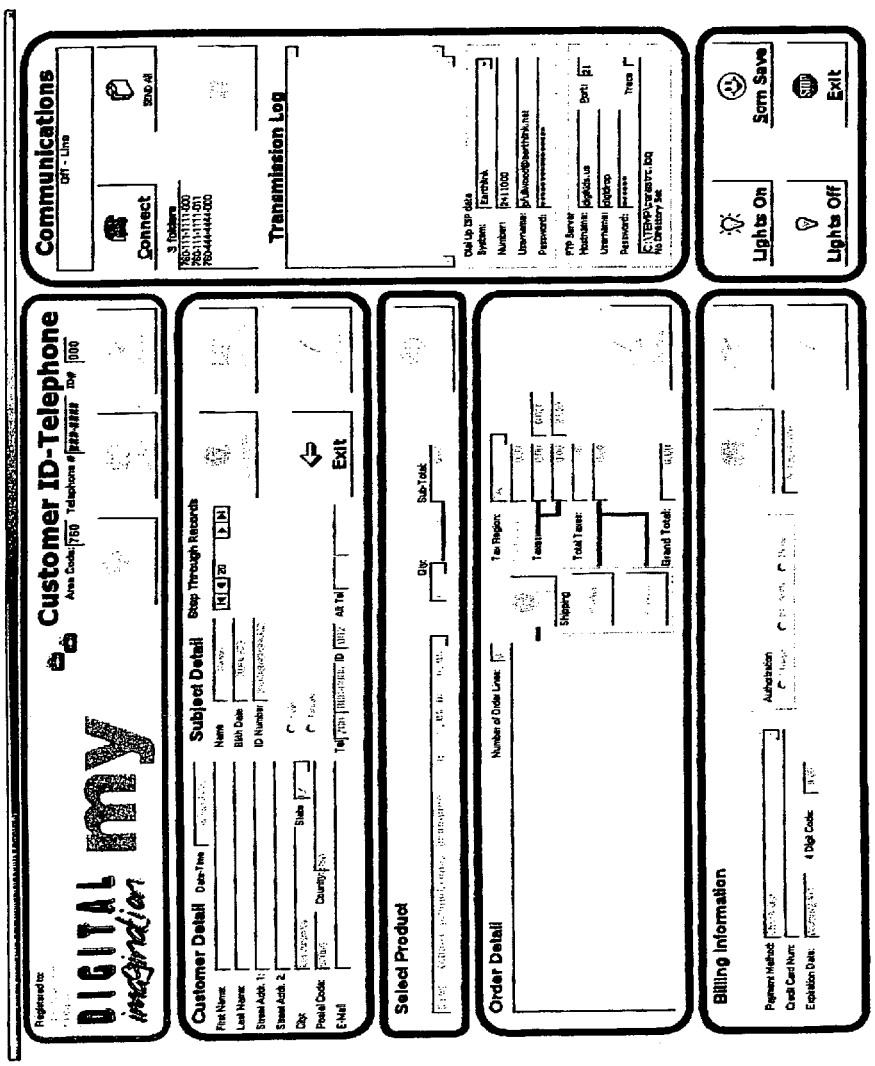
FIG. 10 is a sample of the operator's screen display showing the user's data entry screen during a photo shoot of this invention in a commercial setting or setting where the customer's identity is known (as opposed to a school session where personal information regarding a minor child is not recorded)

Now refer to FIG. 1, in combination with FIG. 9, includes a flow chart showing detail of the front office, multiple camera system. The customer will provide personal data to the operator, which is entered into the system by the operator. The data entry screen is illustrated in FIG. 10. A set of photos, including multiple angles and multiple expressions, are taken of the subject by the operator in the manner described above. The photos are formatted by the specialized system software through the process of FIG. 9 and are saved to a local database in the local computer for storage as well as sent as a final order via modem to the central production database.

FIGS. 11-25 present screen shots of the sequential steps taken in carrying out this invention. They illustrate the process of taking pictures for a subject file in which four different expressions—normal, smiling, surprise and head down—are shot from front and profile positions, and two rear pictures are taken, all using two cameras, to create a subject file, as would be seen by a computer operator.

Figure 11:
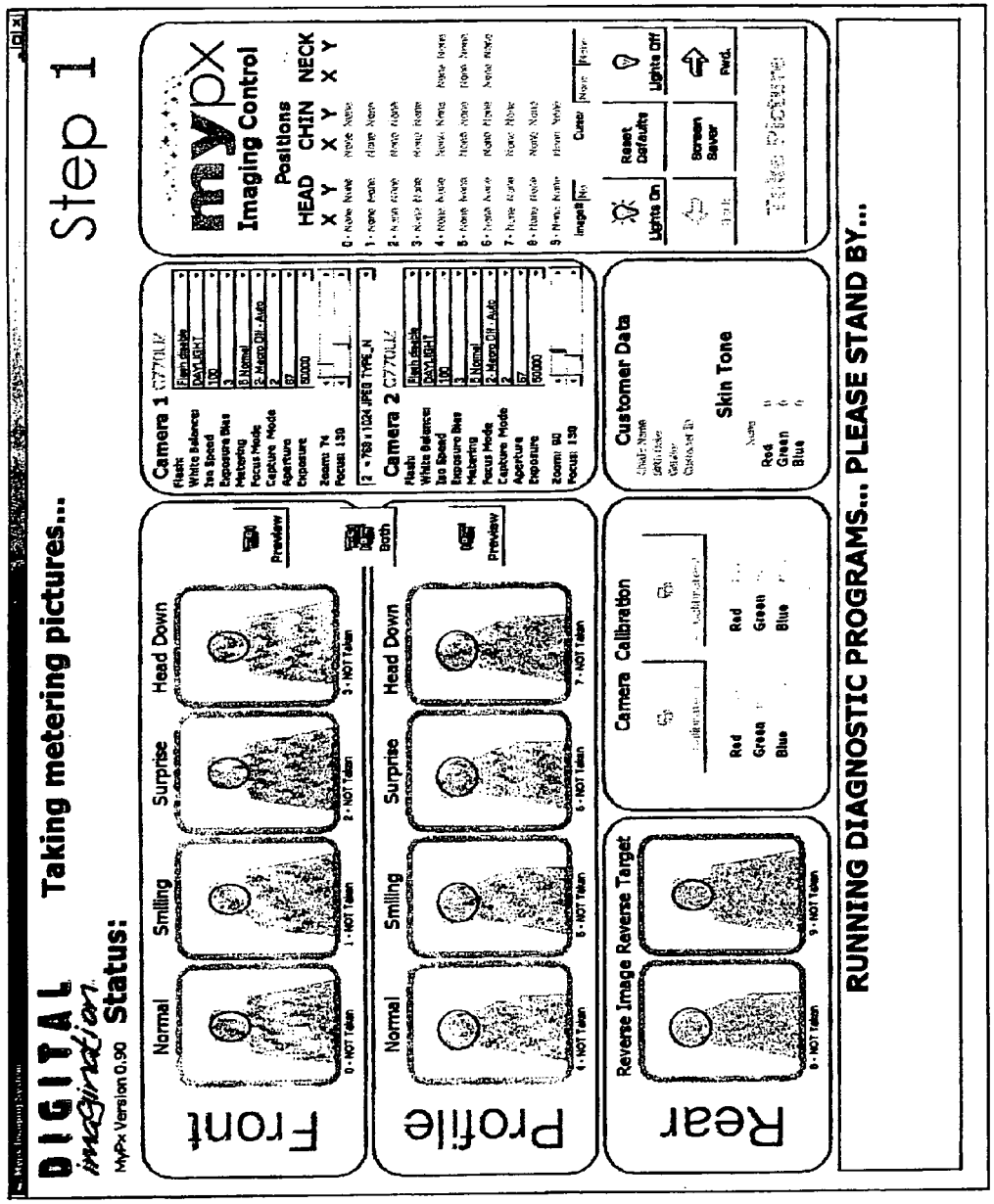
FIGS. 11-25 are screen shots showing illustrative of the process for generating a subject file in accordance with a preferred embodiment of the present invention.

FIG. 11 illustrates a first step before any pictures are taken. The screen shot illustrates that ten pictures will be taken by two cameras, and sets forth details of the picture parameters for the two cameras, which are found under the headings Camera 1 and Camera 2. As shown at the bottom of FIG. 11, this screen shot shows what will appear to the operator upon set-up for a session, because diagnostic computer programs are being run to adjust lighting and prepare for shooting photographs in the session.

Figure 12:
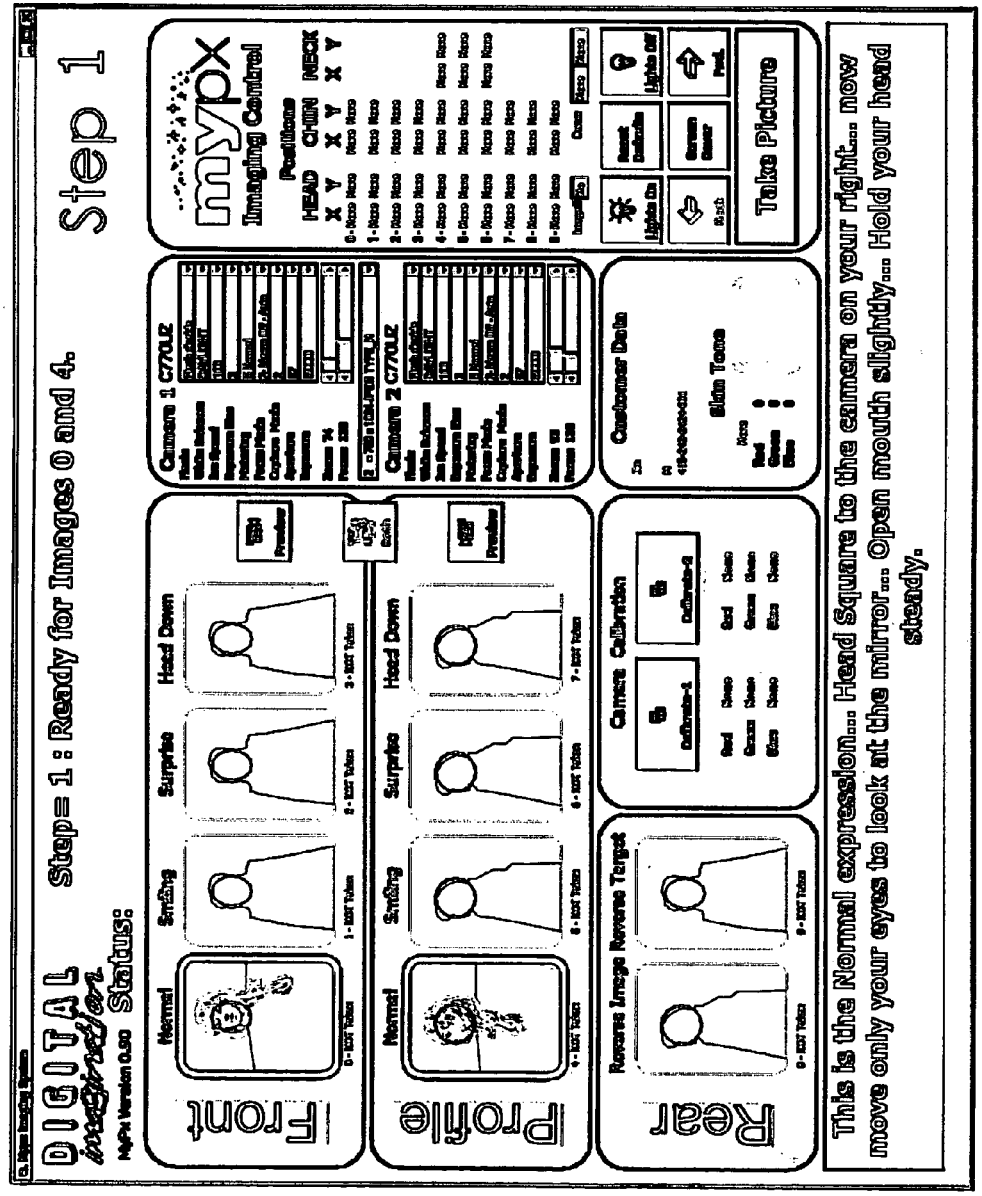

FIG. 12 illustrates a first set of pictures showing a normal expression. The text at the bottom of the screen, beginning with "This is the Normal expression," is a suggested prompt that the operator may use with the subject before the picture is taken. As can be seen from this figure, only the head of the subject appears in the photographs under the normal label, the rest being green background supplied by background 14, drape or front screen 26 and a neck piece.

Figure 13:
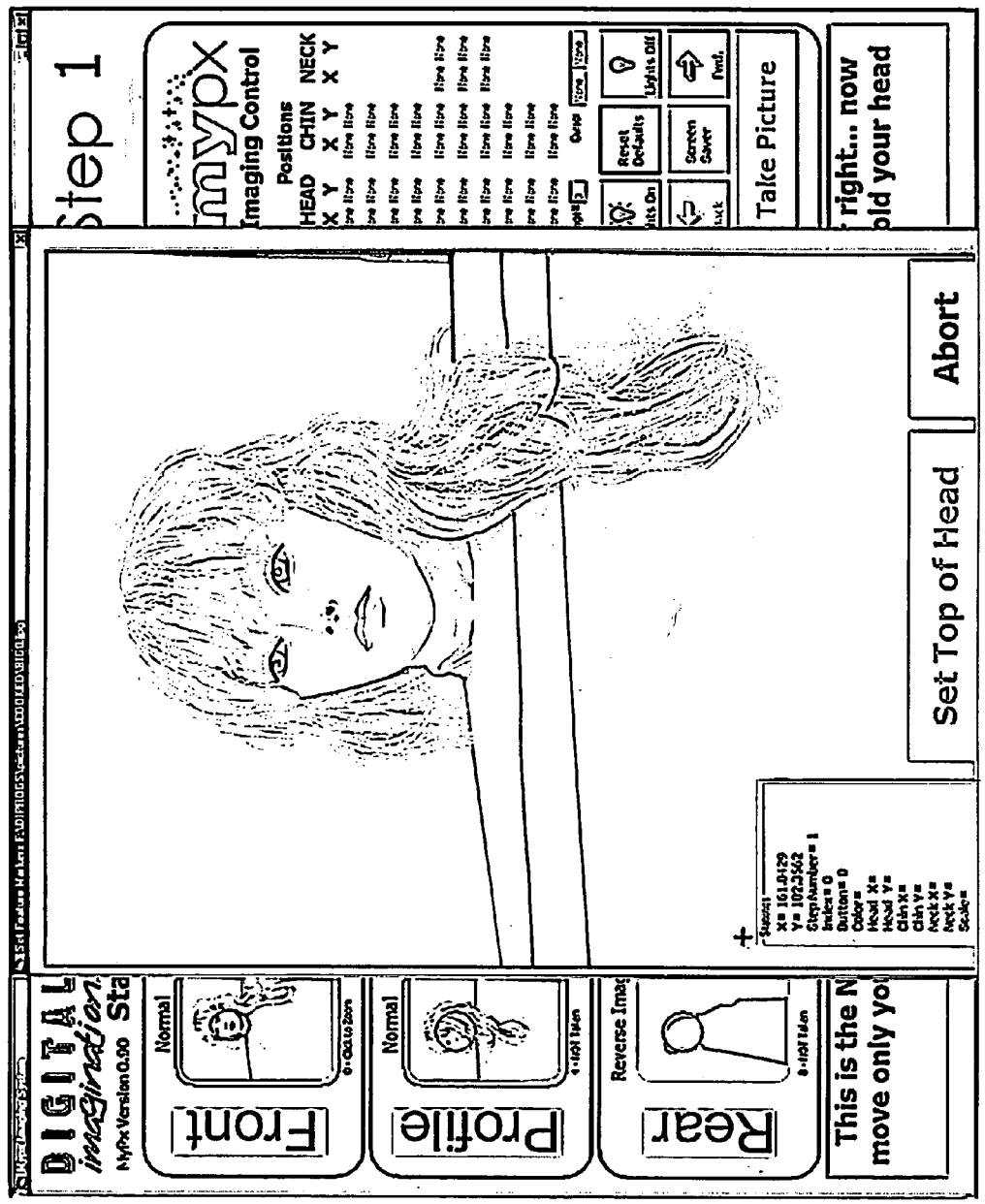

FIG. 13 shows a blow-up of the normal shot shown in FIG. 12 (also, incidentally, all of the photographs shown in FIGS. 12-25 are of a mannequin used for illustrative purposes, instead of a human face, so the facial expressions are fixed and not illustrative of the emotions stated). FIG. 13 shows a pointer in the lower left hand portion of the picture that is to be moved by the operator to the top of the head to set an x-y marker at the top of the head, FIG. 14 showing the marker now moved to that position, and the coordinates set forth as head x=400 and head y=79.

Figure 15:
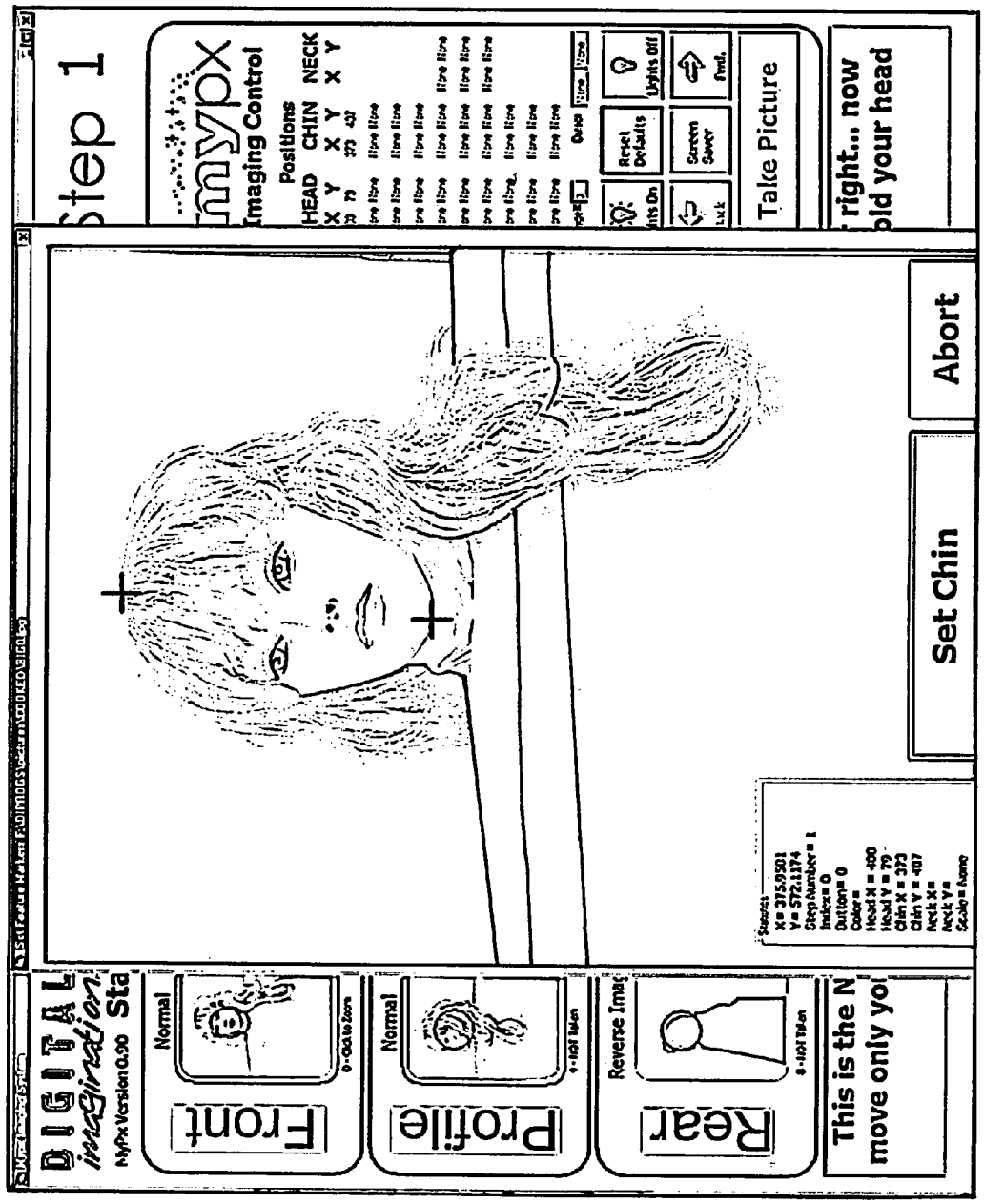

FIG. 15 shows another marker set at the chin, and the statistics box now includes the additional coordinates of chin x=373 and chin y=407.

Figure 14:
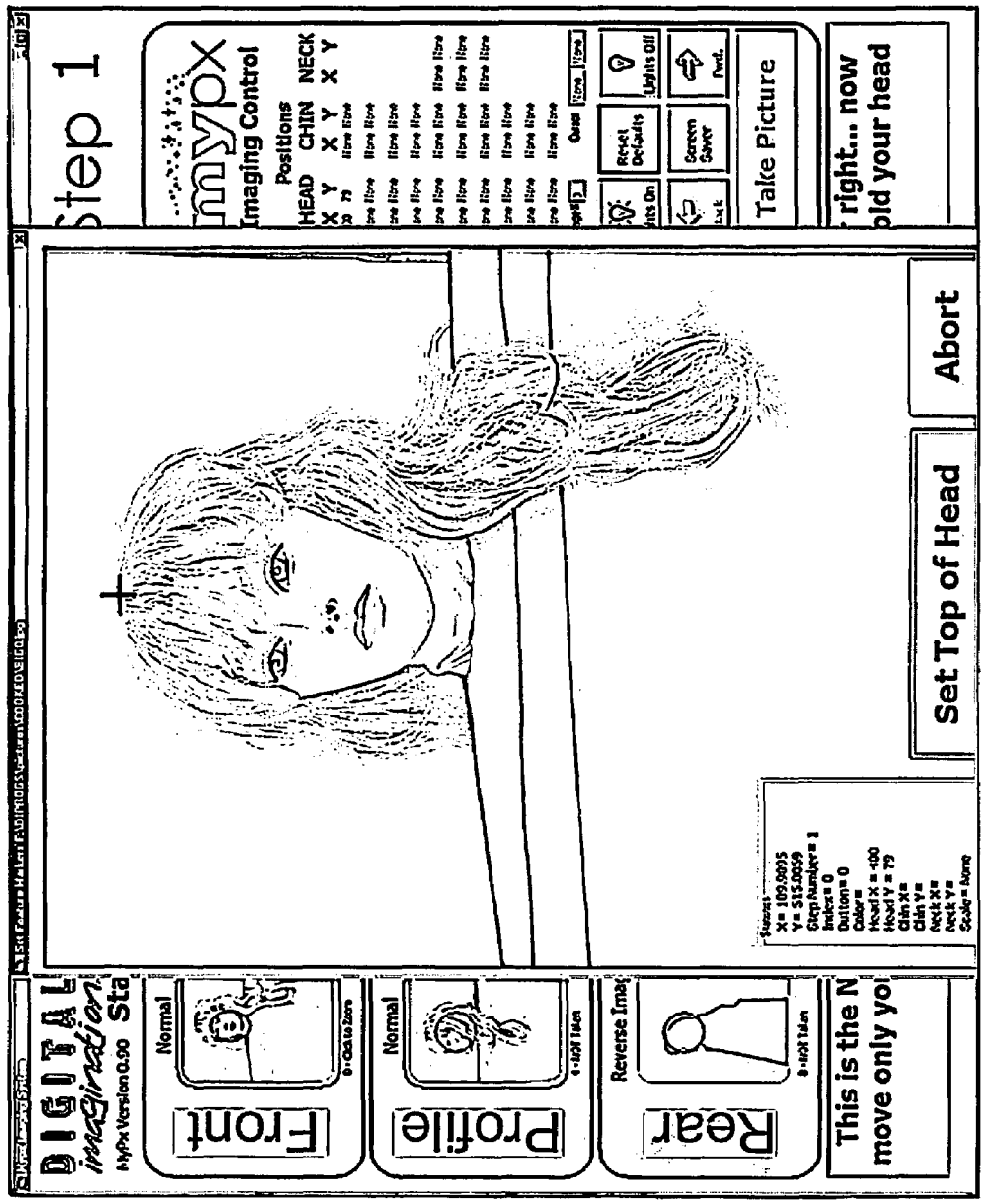
Figure 16:
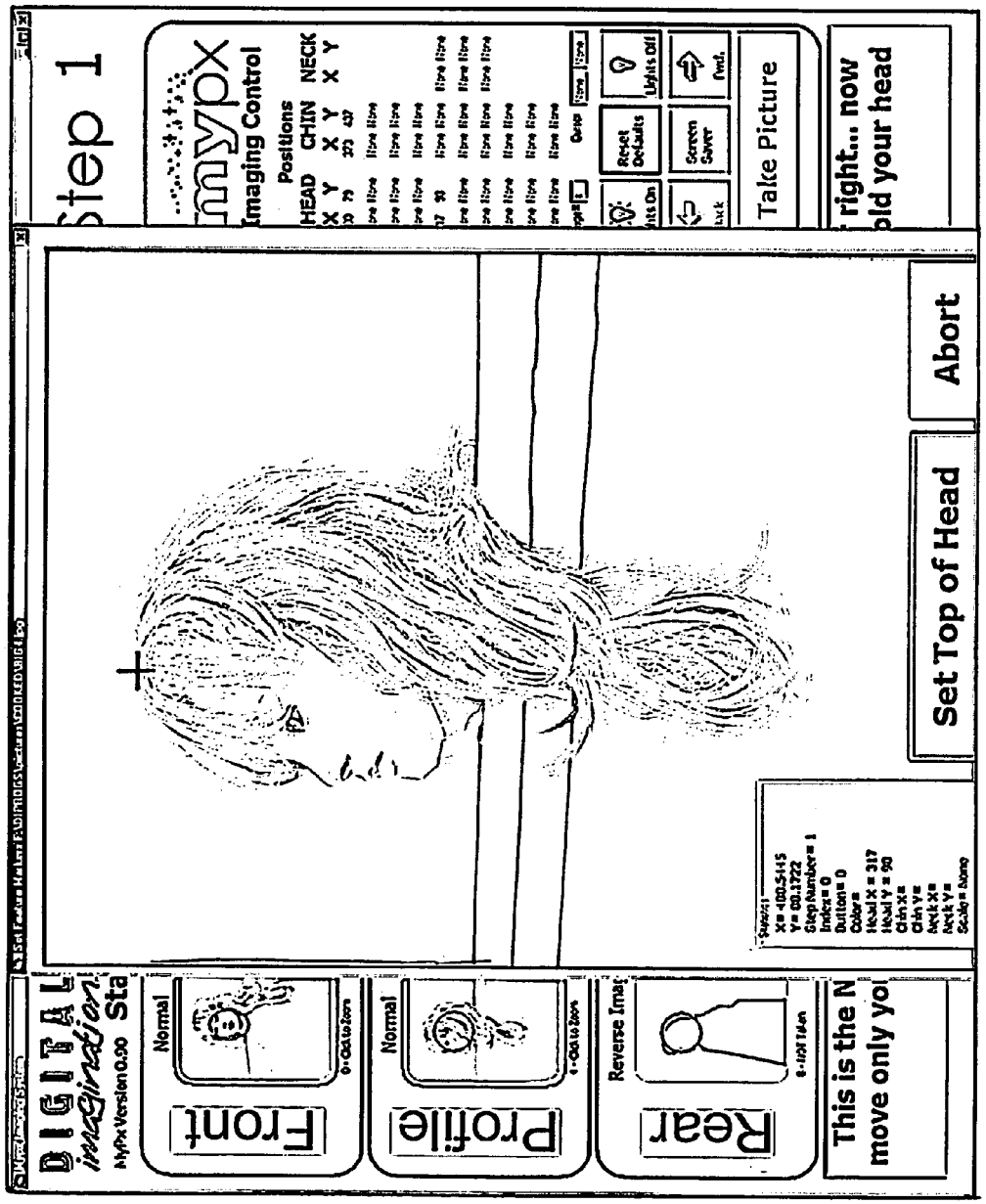
Figure 17:
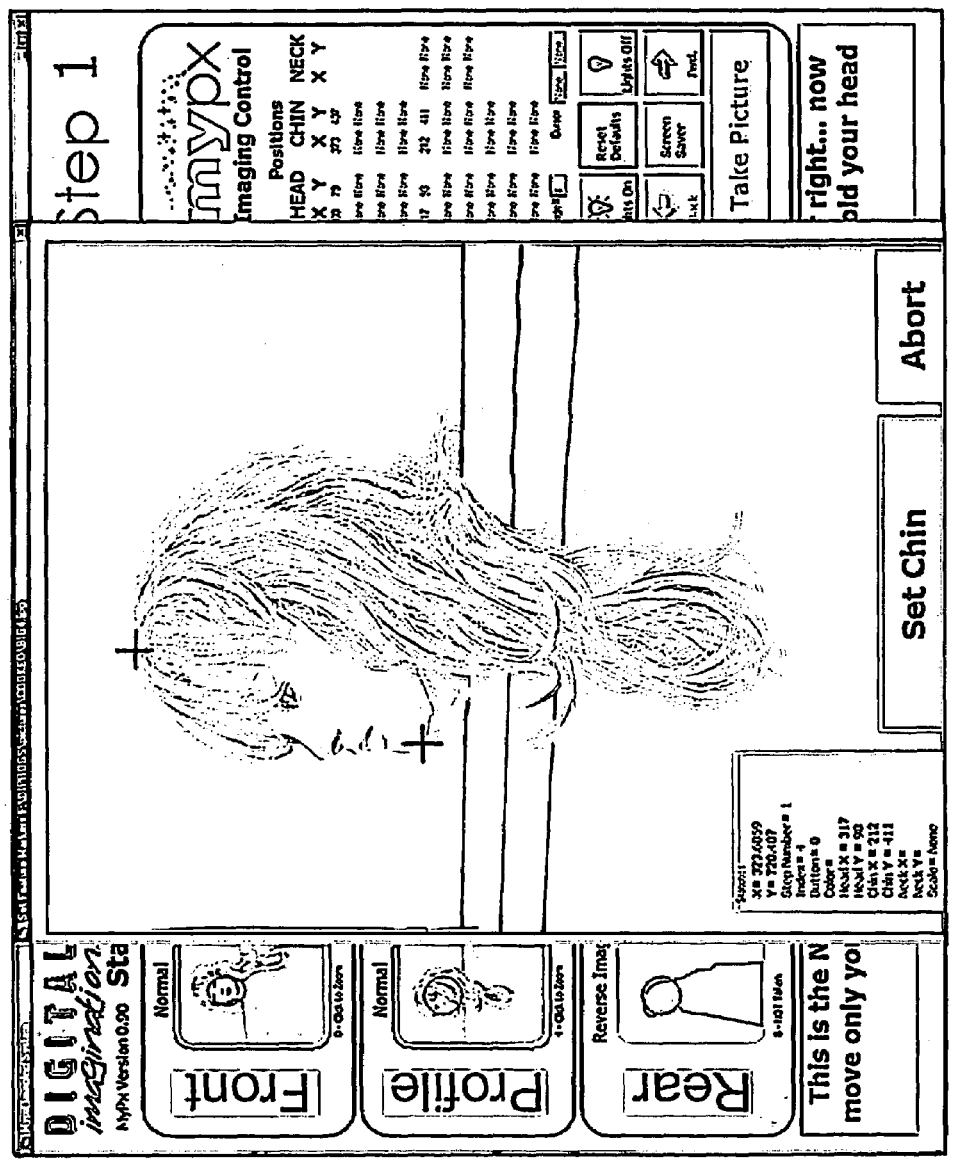
Figure 18:
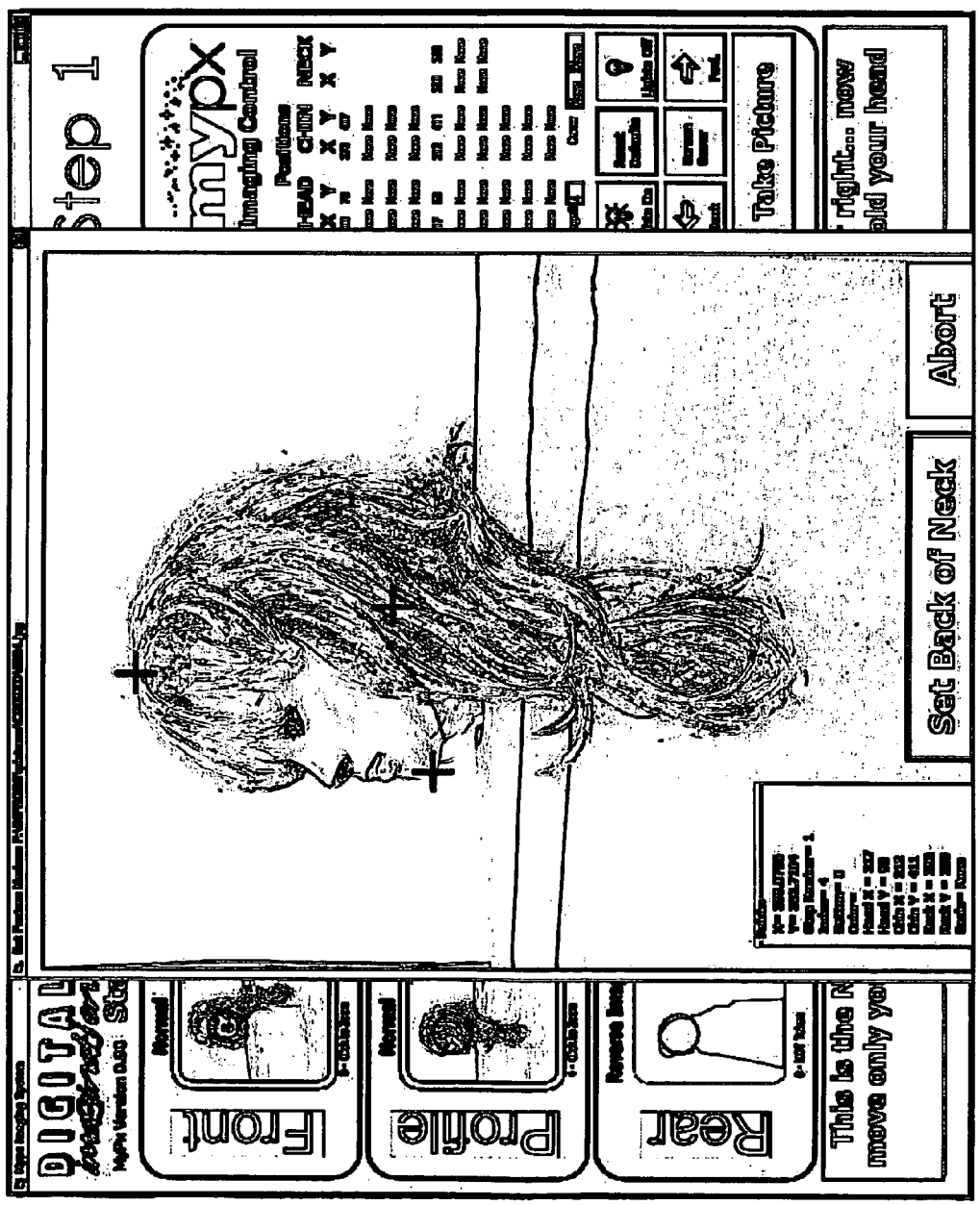
Figure 19:
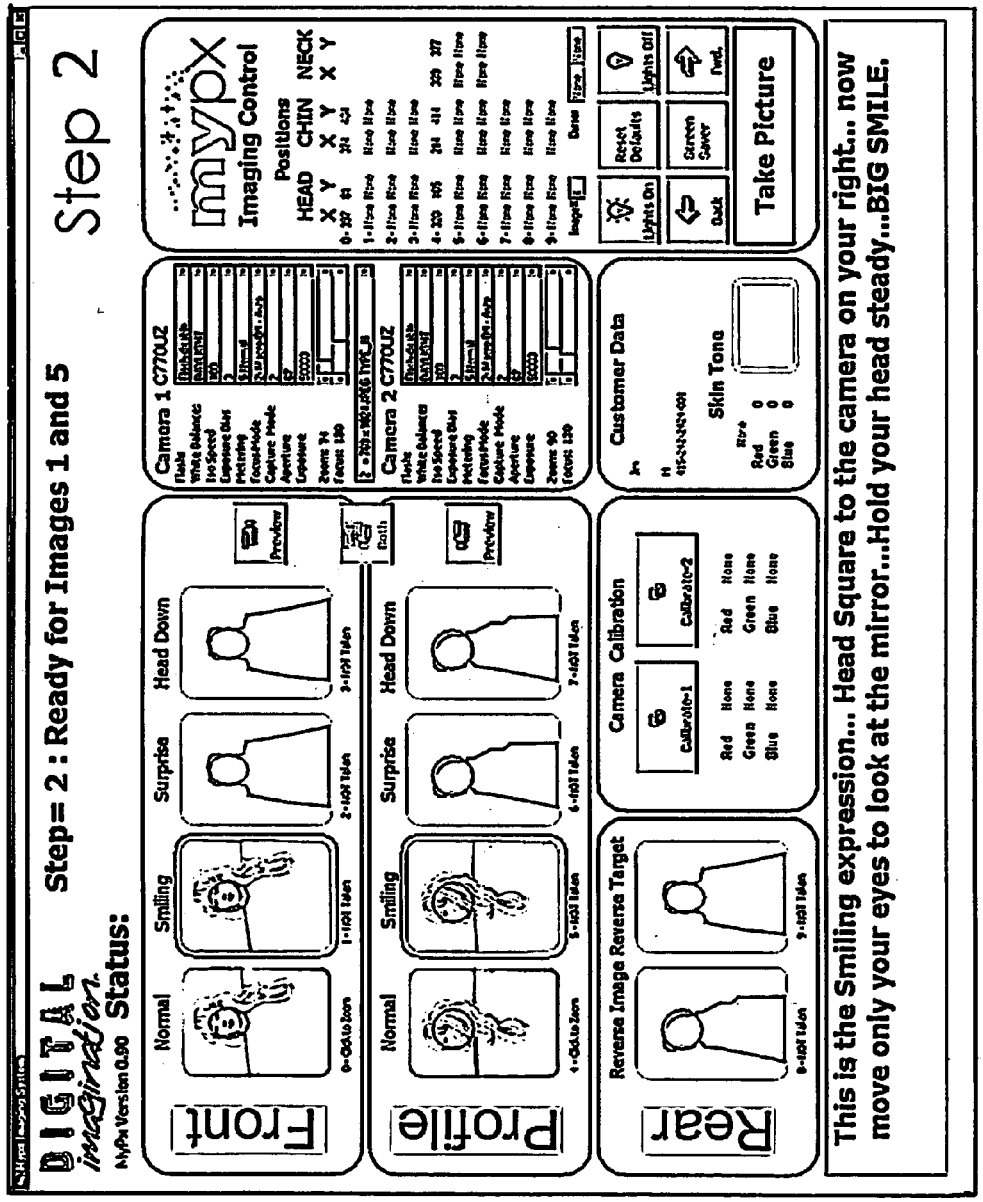
Figure 20:
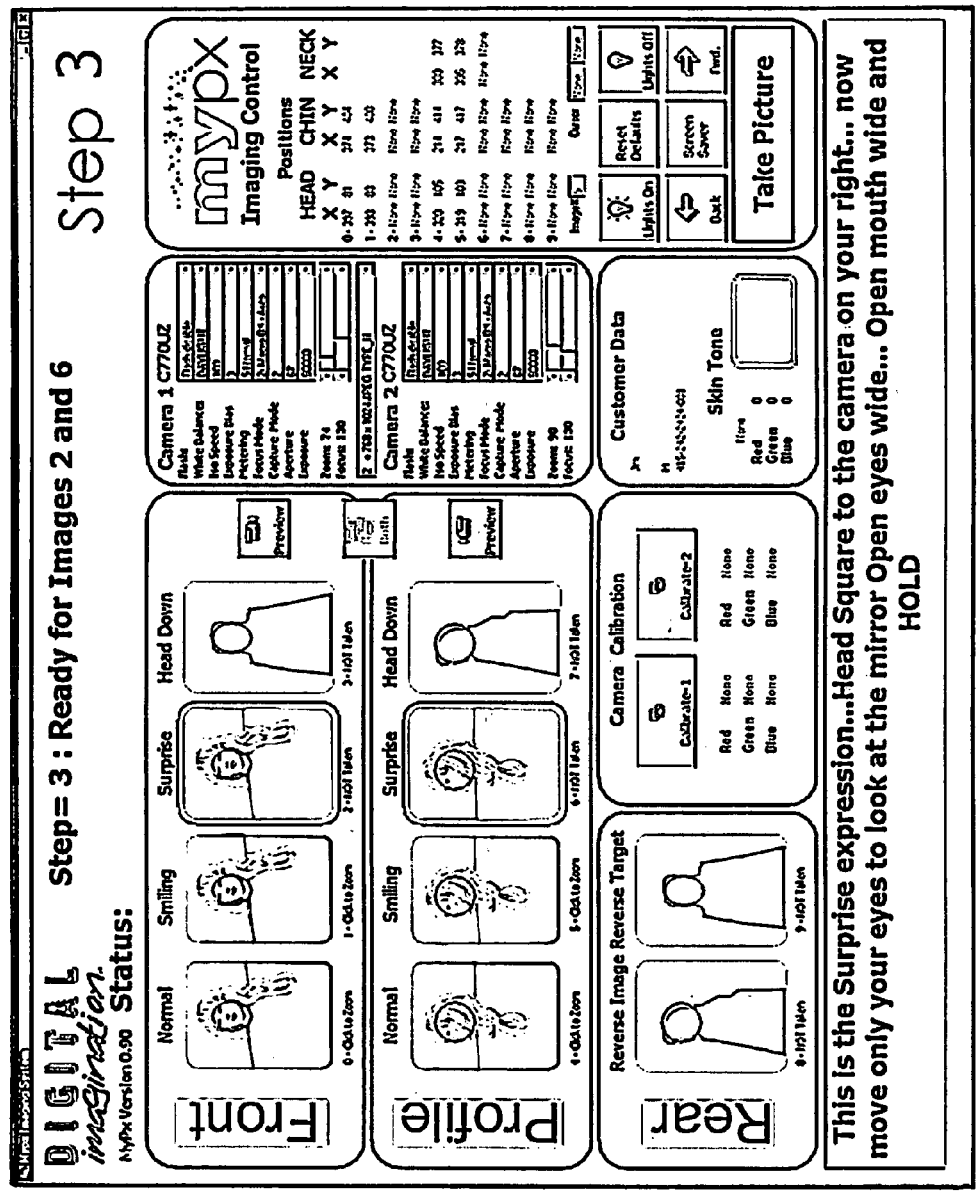
Figure 21:
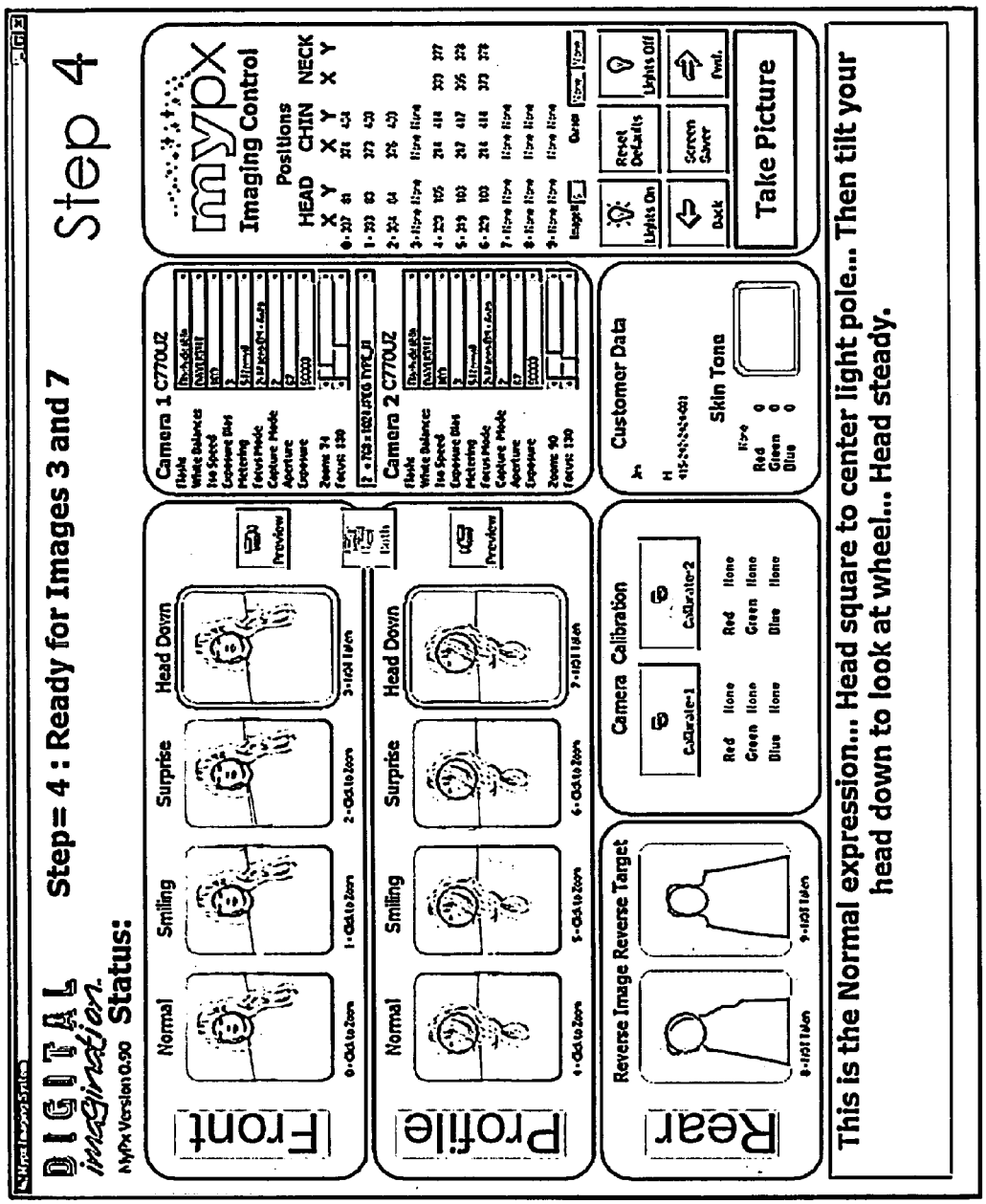

The process of marking the x-y coordinates shown in FIGS. 14 and 15, for a profile picture, is repeated in FIGS. 16-18, except that FIG. 18 also shows the process of setting an x-y marker at the back of the neck, and collecting neck coordinates in the statistics box. As the x-y coordinates are collected for a given picture, they are transferred to an image data file.

Figure 22:
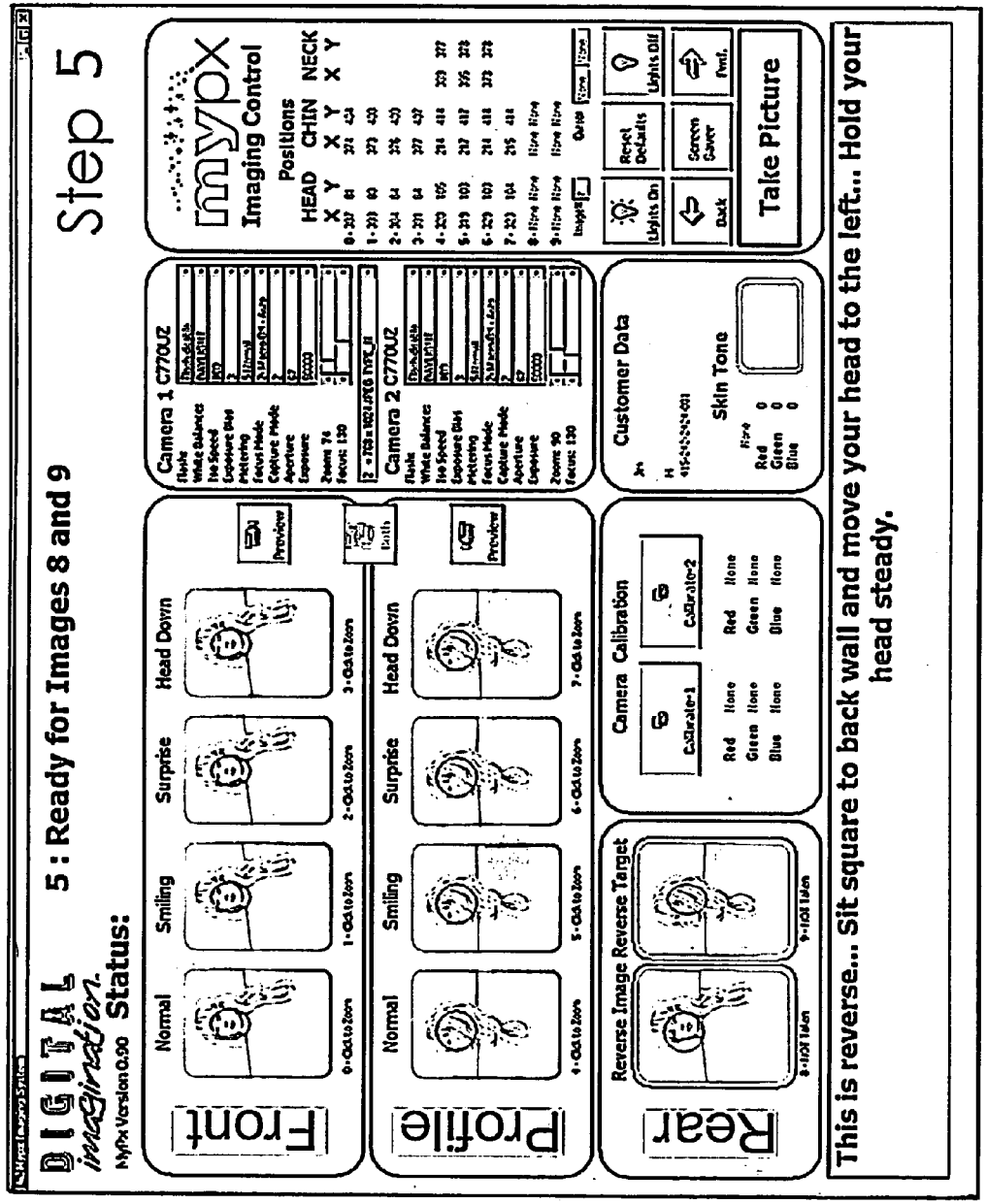

FIGS. 19 through 22 move to additional steps of a subject session process in which additional pairs of photographs are taken of the subject, this time to capture other facial expressions or, in the case of FIG. 22, a reverse view. As was the case in FIG. 12, a screen prompt with a suggested verbal instruction for the subject is set forth in the bottom of the screen. After the pictures have been taken, the x-y coordinates for the pictures would be obtained (or set by the operator) in the same fashion as already described.

Figure 23:
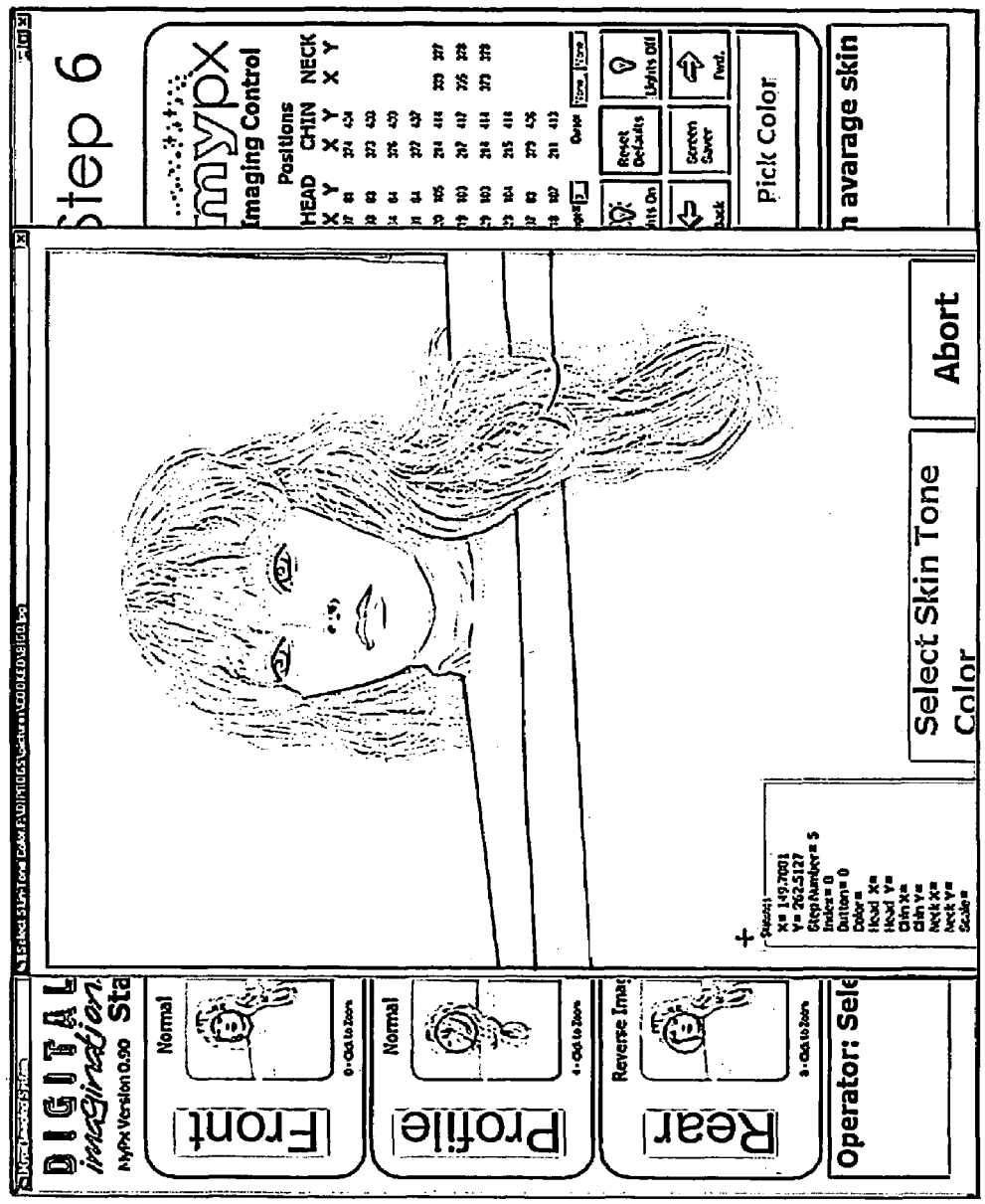
Figure 24:
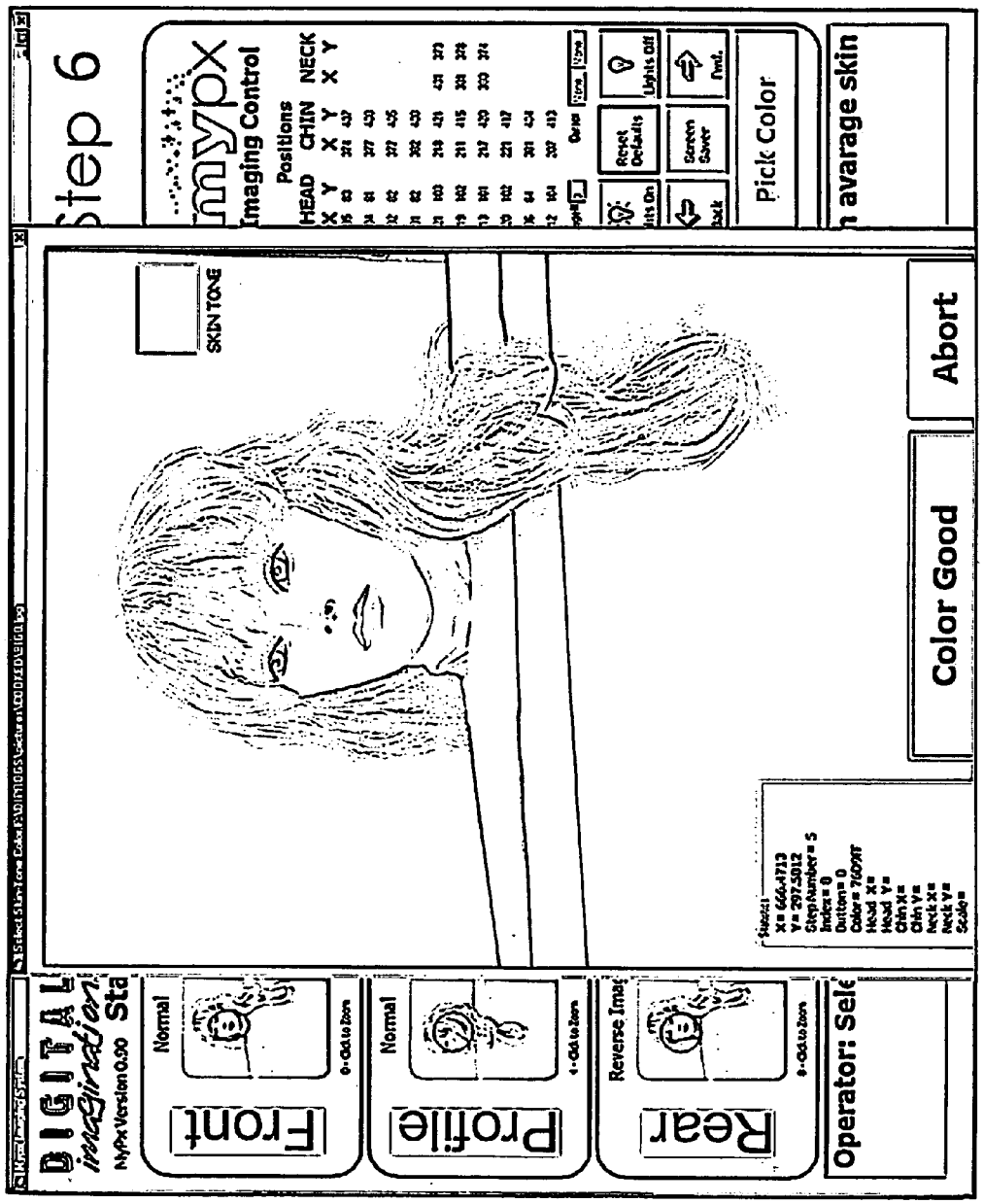

FIGS. 23 and 24 illustrate the process of obtaining a bit map skin file for a subject. A picture is selected from the pictures already taken, and its blow up appears in the screen, as shown in FIG. 23. The operator then obtains a skin color from the photograph (see FIG. 24) and the skin tone is displayed, then saved in a bit map skin file.

Figure 25:
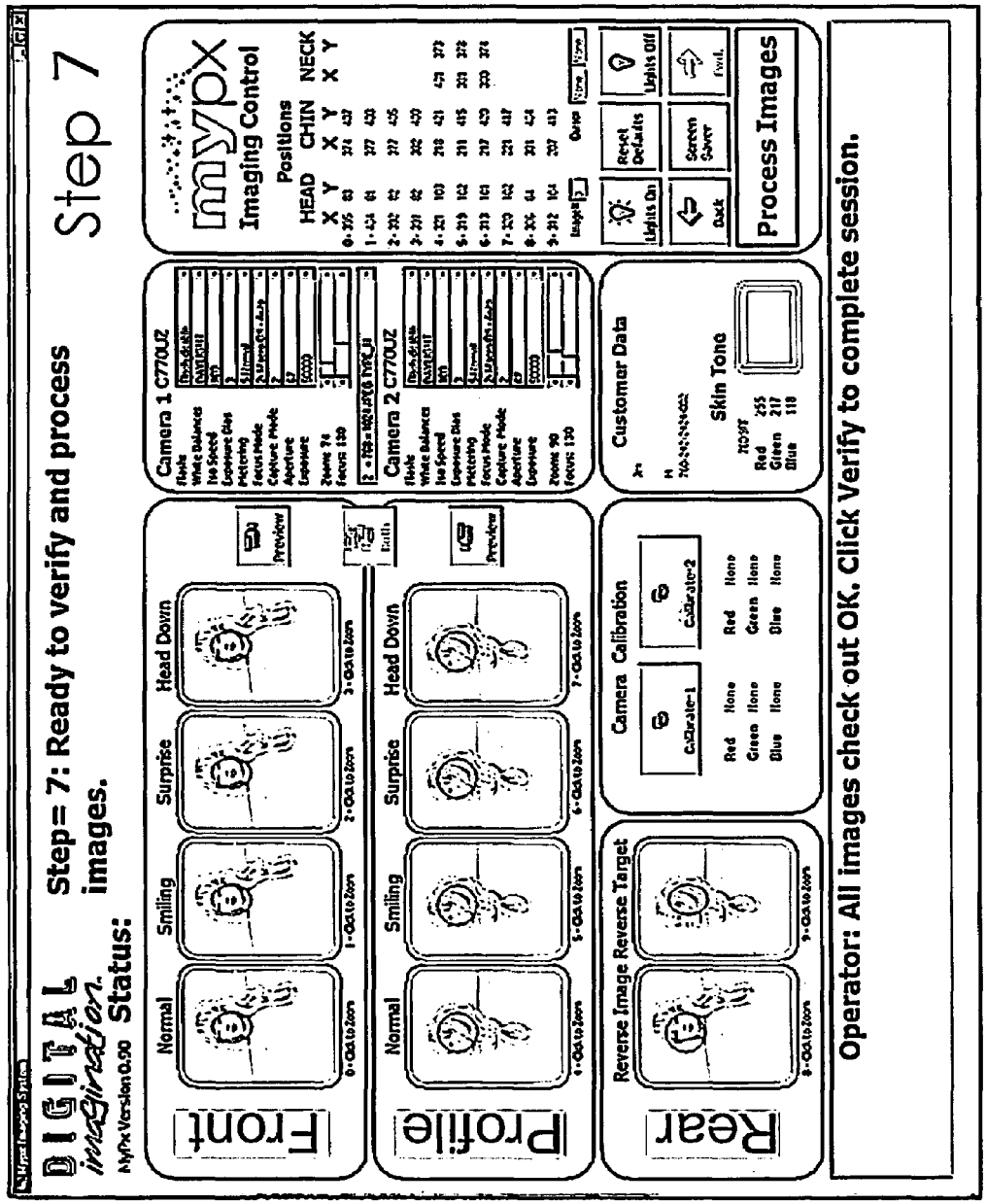

FIG. 25 illustrates the process for completing a subject file. The operator checks to make sure that all of the desired images are okay, and once that is confirmed, a subject file is finalized, and the operator is then ready to create a new subject file for a new subject.

The physical components used in an especially preferred embodiment of this system are:
  Cameras: Olympus 3770 Digital with a USB2 connection
  Computer: ASUS P4P800 mother board with an Intel Pentium 4 2.4 GHz processor, 1 GB RAM, 40 GB hard drive, NVIDIA G4ForceX 128 Mega RAM video card, 56 k dial up modem and CD ROM RWR drive
  Lighting: Two Brifocus 800-650CYC halogen floods with a Brifocus 24 inch by a 24-inch soft box diffuser for each light.

The present invention will now be described in even greater detail by reference to especially the following preferred business method for using it.

It has been found that it is especially preferred to use the photo subject station of the present invention in connection with an orchestrated promotional day or days (i.e., a session) at a school or library where multiple children can be brought in at one time. The children are told that they will be doing a little acting in front of a camera, and that there pictures will be used to create their own customized book, and release forms are distributed to the children's parents and returned before they are actually allowed to take part in a session at a later date.

Once the photo subject station is set up and ready to go, three children are brought in to the room or location where the photo subject station is set up. They are told the poses they will be asked to give, and given a brief explanation of the process. Each child for the session is assigned a sequential number, and that number, plus the child's first name and a phone number for the location where the photographs are being taken, are used to identify the child. This has the advantage of not creating a record containing a personal identification of the subject child that contains the child's full name or telephone number, which might raise certain privacy issues. (While it is still possible to identify the subject child through some investigative work, in that there is a picture of the subject child, the child's first name and a phone number related to a location of the subject child, such as the child's school, this is preferable to simply including the child's name, address and phone number, and provides a level of additional security designed to protect the child's identity. Also, such an indirect identification may make it easier to comply with certain laws in the United States concerning identification of minors.)

When the session is ready to begin, the subject child is fitted with a neck drape, depending on the size of the child's neck, which can be made of a green cloth material secured by Velcro® fasteners (the drapes come in a standard length, 22 inches, and are of variable widths—1.5 inches, 2.5 inches or 3.25 inches). Once the subject child is sitting on the stool, the height of the stool is adjusted so that the subject child's head is properly positioned relative to the fixed location of two cameras, one of which takes a frontal shot, and one of which takes a side profile, both of which are taken simultaneously.

The subject child is next told what facial expression to make, such as a normal expression, a surprise expression or a smile, and two pictures are taken simultaneously, while any desired information regarding the pictures is recorded in an image data file. A computer operator, working at a computer with the digital photographs just taken, centers an x-y marker on the top of the head and the chin for a frontal picture and a profile picture, and also centers an x-y marker on the back of the neck for a profile picture. (The x-y markers are preferably centered during the individual photo shoot session, although it is possible they might be set later.)

After all desired facial expressions have been shot for a subject child (from the 2 cameras for the frontal and profile shots), the subject child is told to turn his or her head and focus on a different location so that a rear image photograph can be shot (the x-y markers used for this angle are top of head and chin). Once all of the desired photographs have been taken for the subject child, the process is repeated for the other two children, and then new children are brought in and the process is repeated, until there are no more subject children.

For each subject child, a subject file is created that contains the photographs taken of the subject child (in this example, there are 8), an image data file, a data file and a bit map skin file. The photograph and bit map skin files are saved as .jpg files while the data files are saved as Word® files. The image data file contains the x-y coordinate data for each of the photographs in the subject file, and any other pertinent information that might be saved concerning such photographs. The data file contains the identification number assigned to the subject child, the subject child's first name (which may also be used in a personalized product), and information relating to the session, such as a session telephone number, date, etc. The computer operator creates the bit map skin file by selecting a skin color from one of the photographs.

Once a given session has been completed, all of the subject files for that session are sent to a Back Office operation via the Internet as a session file. The Back Office operation opens up the session file and proceeds to generate promotional brochures for each subject by using the information contained in the subject's file, and all of the brochures for the session are printed and stuffed with an order sheet in what is perhaps best characterized as a sequential batch operation. After the printing process is completed, all of the brochures for the session are collected together and drop shipped (e.g., by FedEx®), to a central location, such as the school or library where the session photographs were taken, and then somebody at that location distributes each individual brochure to the child who is the subject of that personalized brochure. Orders may be then be collected at that location (or sent in later individually via the mail, facsimile, Internet, etc.) and returned as a group for group fulfillment by a facilitating party at that location.

From the foregoing description, it is apparent that a set of personalized session brochures can be created and distributed, in an efficient and economical manner, without ever having any personalized information concerning the subjects, such as their full name, address or telephone number.

If a pre-purchasing business mode is selected, the brochure production step is eliminated and the Back Office operations are conducted and the finished personalized book or product is delivered directly to the recipient.

The above-described embodiments are merely illustrative of the principles of this invention and are not to be considered as limiting. It is recognized that within the teachings of this application one could produce apparatus or a method with an apparent difference by not departing from the spirit of this invention. Therefore, this invention is defined not by the representative embodiment shown but instead shall be determined from the scope of the following claims, including their equivalents.

We claim:

1. A method for production and distribution of a plurality of personalized products to a plurality of children, comprising the steps of:
   arranging for the plurality of children to be at a session at a preselected location on a preselected date with a preselected party in charge of organization;
   setting up a photo subject station for capturing information regarding a subject suitable for integration into a personalized printed product at the preselected location on the preselected date;
   using the photo subject station to create a session file for the session that is comprised of one subject file for each of the plurality of children, each of the subject files containing a plurality of photographs of a subject child, an image data file associated with the plurality of photographs of the subject file, a data file containing an identification of the subject, and a bit map skin file of the subject;
   transferring the session file to a back end operation;
   printing the plurality of personalized products for the plurality of children by use of the session file in the back end operation, wherein each of the personalized products is uniquely different from each of the other personalized products through use of unique information in the subject files;
   shipping the plurality of personalized products to the preselected party;
   having the preselected party distribute the plurality of personalized products to the plurality of children such that each of the plurality of children receives that child's own personalized product.

2. The method of claim 1, wherein the personalized product is a sales brochure for the purchase of personalized products.

3. The method of claim 2, comprising the further steps of:
   collecting one or more orders from the plurality of children;
   printing one or more purchased personal products for the plurality of children based upon the one or more orders;
   shipping the one or more purchased personal products to the preselected party; and
   having the preselected party distribute the one or more purchased personal products to the one or more children who ordered the one or more purchased personal products.

4. The method of claim 1, wherein the subject file does not contain a personal identification of the subject child.

5. The method of claim 1, wherein the preselected location is a school.

6. The method of claim 1 wherein the preselected location is a plurality of locations.

7. The method of claim 1, wherein the preselected person is an organization.

8. The method of claim 1, wherein the preselected date is on more than one day.

9. The method of claim 1, wherein the photo subject station is comprised of a head positioning means for positioning a subject head at preselected picture location, a color background device for isolating the subject head, two cameras located at two preselected camera locations from the preselected picture location, two lighting devices set at two preselected lighting locations for illuminating the subject head at the preselected position and a computer for creating and storing the session file based upon input from the two cameras.

* * * * *